(12) United States Patent
Chen et al.

(10) Patent No.: US 12,256,082 B2
(45) Date of Patent: Mar. 18, 2025

(54) BLOCK BOUNDARY PREDICTION REFINEMENT WITH OPTICAL FLOW

(71) Applicant: VID SCALE, INC., Wilmington, DE (US)

(72) Inventors: Wei Chen, San Diego, CA (US); Jiancong Luo, Skillman, NJ (US); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 116 days.

(21) Appl. No.: 17/616,449

(22) PCT Filed: Jun. 2, 2020

(86) PCT No.: PCT/US2020/035759
§ 371 (c)(1),
(2) Date: Dec. 3, 2021

(87) PCT Pub. No.: WO2020/247394
PCT Pub. Date: Dec. 10, 2020

(65) Prior Publication Data
US 2022/0239921 A1    Jul. 28, 2022

Related U.S. Application Data

(60) Provisional application No. 62/856,519, filed on Jun. 3, 2019.

(51) Int. Cl.
*H04N 19/137*    (2014.01)
*H04N 19/132*    (2014.01)
(Continued)

(52) U.S. Cl.
CPC ......... *H04N 19/137* (2014.11); *H04N 19/132* (2014.11); *H04N 19/176* (2014.11); *H04N 19/182* (2014.11)

(58) Field of Classification Search
CPC .. H04N 19/137; H04N 19/132; H04N 19/176; H04N 19/182
See application file for complete search history.

(56) References Cited

U.S. PATENT DOCUMENTS 9,167,269 B2    10/2015  Van Der Auwera et al.
9,571,853 B2    2/2017   Lee et al.
(Continued)

FOREIGN PATENT DOCUMENTS

CN    113875253 A    12/2021
EP    3 957 073 A1    2/2022
(Continued)

OTHER PUBLICATIONS

Chen et al., "Algorithm description for Versatile Video Coding and Test Model 4 (VIM 4)", Jan. 9, 2019, JVET-M1002-v2 (Year: 2019).*

(Continued)

*Primary Examiner* — Jonathan R Messmore
(74) *Attorney, Agent, or Firm* — Condo Roccia Koptiw LLP

(57) ABSTRACT

Systems, methods, and instrumentalities are disclosed for sub-block/block refinement, including sub-block/block boundary refinement, such as block boundary prediction refinement with optical flow (BBPROF). A block comprising a current sub-block may be decoded based on a sample value for a first pixel that is obtained based on, for example, an MV for a current sub-block, an MV for a sub-block adjacent the current sub-block, and a sample value for a second pixel adjacent the first pixel. BBPROF may include determining spatial gradients at pixel(s)/sample location(s). An MV difference may be calculated between a current sub-block and one or more neighboring sub-blocks. An MV offset may be determined at pixel(s)/sample location(s) based on the MV difference. A sample value offset for the (Continued)

pixel in a current sub-block may be determined. The prediction for a reference picture list may be refined by adding the calculated sample value offset to the sub-block prediction.

20 Claims, 16 Drawing Sheets

(51) Int. Cl.
  *H04N 19/176* (2014.01)
  *H04N 19/182* (2014.01)

(56) References Cited

U.S. PATENT DOCUMENTS

| | | | |
|---|---|---|---|
| 10,595,035 | B2 | 3/2020 | Karczewicz et al. |
| 2020/0288168 | A1* | 9/2020 | Zhang .................. H04N 19/583 |
| 2021/0136407 | A1* | 5/2021 | Aono ..................... H04N 19/55 |
| 2022/0201328 | A1 | 6/2022 | Galpin et al. |

FOREIGN PATENT DOCUMENTS

| | | |
|---|---|---|
| JP | 2020-511859 A | 4/2020 |
| JP | 2022-529104 A | 6/2022 |
| MX | 2021012698 A | 11/2021 |
| RU | 2586003 C2 | 6/2016 |
| RU | 2659733 C2 | 7/2018 |
| WO | 2018/169989 A1 | 9/2018 |
| WO | 2019/067879 A1 | 4/2019 |
| WO | 2020/163319 A1 | 8/2020 |
| WO | 2020/214564 A1 | 10/2020 |

OTHER PUBLICATIONS

Bross et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pages.
Bross et al., "Versatile Video Coding (Draft 2)", JVET-K1001-V1, Editors, Joint Video Experts Team (JVET) of ITU-T SG 16 WP3 and ISO/IEC JTC1/SC29/WG11, 11th Meeting: Ljubljana, SI, Jul. 10-18, 2018, 42 pages.
Chen et al., "Algorithm Description for Versatile Video Coding and Test Model 4 (VTM 4)", JVET-M1002-V2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-62.
Chen, Wei, "Non-CE9: Block Boundary Prediction Refinement with Optical Flow for DMVR", JVET-O0581, InterDigital Communications, Inc., Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-3.
Hsiao et al., "CE4-Related: Overlapped Block Optical Flow", JVET-P0153-V2, MediaTek Inc., Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.
ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.
Luo et al., "CE2-Related: Prediction Refinement with Optical Flow for Affine Mode", JVET-N0236-R5, InterDigital Communications, Inc., Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-7.
Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.
SMPTE, "VC-1 Compressed Video Bitstream Format and Decoding Process", SMPTE 421M, Apr. 2006, 493 pages.
Suhring et al., "H.264/14496-10 AVC Reference Software Manual (Revised for JM 19.0)", JVT-AE010, Apple Inc., Fraunhofer HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting, London, UK, Available at <http://iphome.hhi.de/suehring/tml/download/jm16.1.zip>, Jun. 28-Jul. 3, 2009, 98 pages.
Wikipedia, "Sobel Filter", Available at <https://en.wikipedia.org/wiki/Sobel_operator>, Feb. 20, 2021, pp. 1-8.
Chen et al., "Algorithm Description for Versatile Video Coding and Test Model 4 (VTM 4)", JVET-M1002-v1, Editors, Jot Video Experts Team JVET) of ITU-T SG 16 WP 3 and ISO/IEC JTC 1/SC 29/WG 11, 13th Meeting: Marrakech, MA, Jan. 9-18, 2019, 60 pages.
Chen et al., "Description of SDR, HDR and 360 Video Coding Technology Proposal by Huawei, GoPro, HiSilicon, and Samsung", JVET-J0025_V2, Joint Video Exploration Team (JVET) of ITU-T SG 16 WP 3 and ISO/IEC JTC 1/SC 29/WG 11, 10th Meeting, San Diego, CA, United States, Apr. 10, 2018, 132 pages.
"BMS-2.0 Reference Software", Available at <https://vcgit.hhi.fraunhofer.de/jvet/VVCSoftware_BMS/tags/BMS-2.1rc1>, 1 page.

* cited by examiner

BLOCK BOUNDARY PREDICTION REFINEMENT WITH OPTICAL FLOW

CROSS REFERENCE TO RELATED APPLICATIONS

This application is the National Stage Entry under 35 U.S.C. § 371 of Patent Cooperation Treaty Application No. PCT/US2020/035759, filed Jun. 2, 2020, which claims priority to U.S. Provisional Patent Application No. 62/856,519, filed on Jun. 3, 2019, and entitled "Block Boundary Prediction Refinement with Optical Flow," the entirety of which is incorporated by reference as if fully set forth herein.

BACKGROUND

Video coding systems may be used to compress digital video signals, for example, to reduce the storage and/or transmission bandwidth needed for such signals. Video coding systems may include block-based, wavelet-based, and/or object-based systems. A block-based hybrid video coding system may be deployed.

SUMMARY

Systems, methods, and instrumentalities are disclosed for sub-block/block refinement, including sub-block/block boundary refinement, such as block boundary prediction refinement with optical flow (BBPROF). A block comprising a current sub-block may be decoded based on a sample value obtained for a first pixel, which may be obtained based on, for example, a motion vector (MV) for a current sub-block, an MV for a sub-block adjacent to the current sub-block, and a sample value for a second pixel adjacent to the first pixel. Sub-block/block refinement may be applied in decoder side motion vector refinement (DMVR) mode, subblock-based temporal motion vector prediction (SbTMVP) mode, and/or affine mode. BBPROF may include, for example, sub-block based motion compensation to generate sub-block based prediction. Spatial gradients of the sub-block based prediction may be calculated at one or more pixels/sample locations. An MV difference may be calculated between a current sub-block and one or more neighboring sub-blocks. The MV difference may be used to calculate a motion vector offset at one or more pixels/sample locations. An intensity change per pixel in a current sub-block may be calculated based on an optical flow. A sample value offset may be used to indicate the intensity change per pixel. The prediction (for example, motion compensated prediction) for a pixel or a sample location may be refined, for example, by adding the calculated intensity change to the sub-block prediction.

In examples, a method may be implemented to perform sub-block/block refinement. The method may be implemented, for example, by an apparatus, which may comprise one or more processors configured to execute computer executable instructions, which may be stored on a computer readable medium or a computer program product, that, when executed by the one or more processors, performs the method. The apparatus may, thus, comprise one or more processors configured to perform the method. The computer readable medium or the computer program product may comprise instructions that cause one or more processors to perform the method by executing the instructions. A computer readable medium may contain data content generated according to the method. A signal may comprise a residual that is generated based on the original image block and a block that is predicted using the obtained sample value for the first pixel according to the method. An apparatus may comprise an accessing unit and a transmitter configured to execute a second method comprising accessing data including a residual that is generated based on the obtained sample value for the first pixel according to the apparatus comprising one or more processors configured to implement the method (e.g., by executing instructions), and transmitting the data including the residual. A device, such as a television, a cellular phone, a tablet or a set-top box, may comprise the apparatus with one or more processors configured to implement the method (e.g., by executing instructions) and at least one of (i) an antenna configured to receive a signal, the signal including data representative of an image, (ii) a band limiter configured to limit the received signal to a band of frequencies that includes the data representative of the image, or (iii) a display configured to display the image.

The method for performing sub-block/block refinement may comprise, for example, obtaining a sample value for a first pixel based on, for example, an MV for a current sub-block, an MV for a sub-block that is adjacent to the current sub-block, and a sample value for a second pixel that is adjacent to the first pixel; and decoding a block comprising the current sub-block based on the obtained sample value for the first pixel.

A method of encoding a block comprising the current sub-block based on the obtained sample value for the first pixel may comprise, for example, obtaining a sample value for a first pixel based on, for example, an MV for a current sub-block, an MV for a sub-block that is adjacent to the current sub-block, and a sample value for a second pixel that is adjacent to the first pixel; and encoding a block comprising the current sub-block based on the obtained sample value for the first pixel.

The block may comprise, for example, the first pixel, the second pixel, and a third pixel that is adjacent to the first pixel. Obtaining the sample value for the first pixel may comprise, for example, determining that the first pixel is adjacent to a boundary of the current sub-block; determining: (i) a difference between the MV for the current sub-block and the MV for the sub-block that is adjacent to the current sub-block, (ii) a gradient for the first pixel based on the sample value for the second pixel and a sample value for the third pixel, and (iii) a sample value offset based on the determined gradient and the difference between the MV for the current sub-block and the MV for the sub-block that is adjacent to the current sub-block; and obtaining the sample value for the first pixel based on the determined sample value offset.

A gradient may be determined, for example, based on at least the sample value for the second pixel. The sample value for the first pixel may be obtained using the gradient.

A gradient for an optical flow model may be determined, for example, based on at least the sample value for the second pixel. The gradient may be used in the optical flow model to obtain the sample value for the first pixel.

A difference between the MV for the current sub-block and the MV for the sub-block that adjacent to the current sub-block may be used to obtain the sample value for the first pixel.

The sub-block that is adjacent to the current sub-block may be a first sub-block. The block may comprise the first sub-block and a second sub-block that is adjacent to the current sub-block. The sample value for the first pixel may be obtained (for example, further) based on an MV for the second sub-block.

The sample value for the first pixel may be obtained based on a determination that the first pixel is adjacent to a boundary of the current sub-block.

The first pixel and the second pixel may be in the current sub-block.

A weighting factor may be used to obtain the sample value for the first pixel. A weighting factor may vary in accordance with a distance of the first pixel from a corresponding boundary of the current sub-block.

A sample value offset for the first pixel may be determined, for example, based on the MV for the current sub-block, the MV for the sub-block that is adjacent to the current sub-block, and the sample value for the second pixel that is adjacent to the first pixel. The sample value for the first pixel may be obtained using the determined sample value offset and a predicted sample value for the first pixel.

The sample value for the first pixel may be obtained, for example, based on a determination that the first pixel is adjacent to a boundary of the current sub-block. The boundary of the current sub-block may comprise a common boundary between the current sub-block and the sub-block that is adjacent to the current sub-block.

The first pixel may be located, for example, in four rows of pixels from the top boundary of the current sub-block, in four rows of pixels from the bottom boundary of the current sub-block, in four columns of pixels from the left boundary of the current sub-block, or in four columns of pixels from the right boundary of the current sub-block.

Each feature disclosed anywhere herein is described, and may be implemented, separately/individually and in any combination with any other feature disclosed herein and/or with any feature(s) disclosed elsewhere that may be impliedly or expressly referenced herein or may otherwise fall within the scope of the subject matter disclosed herein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
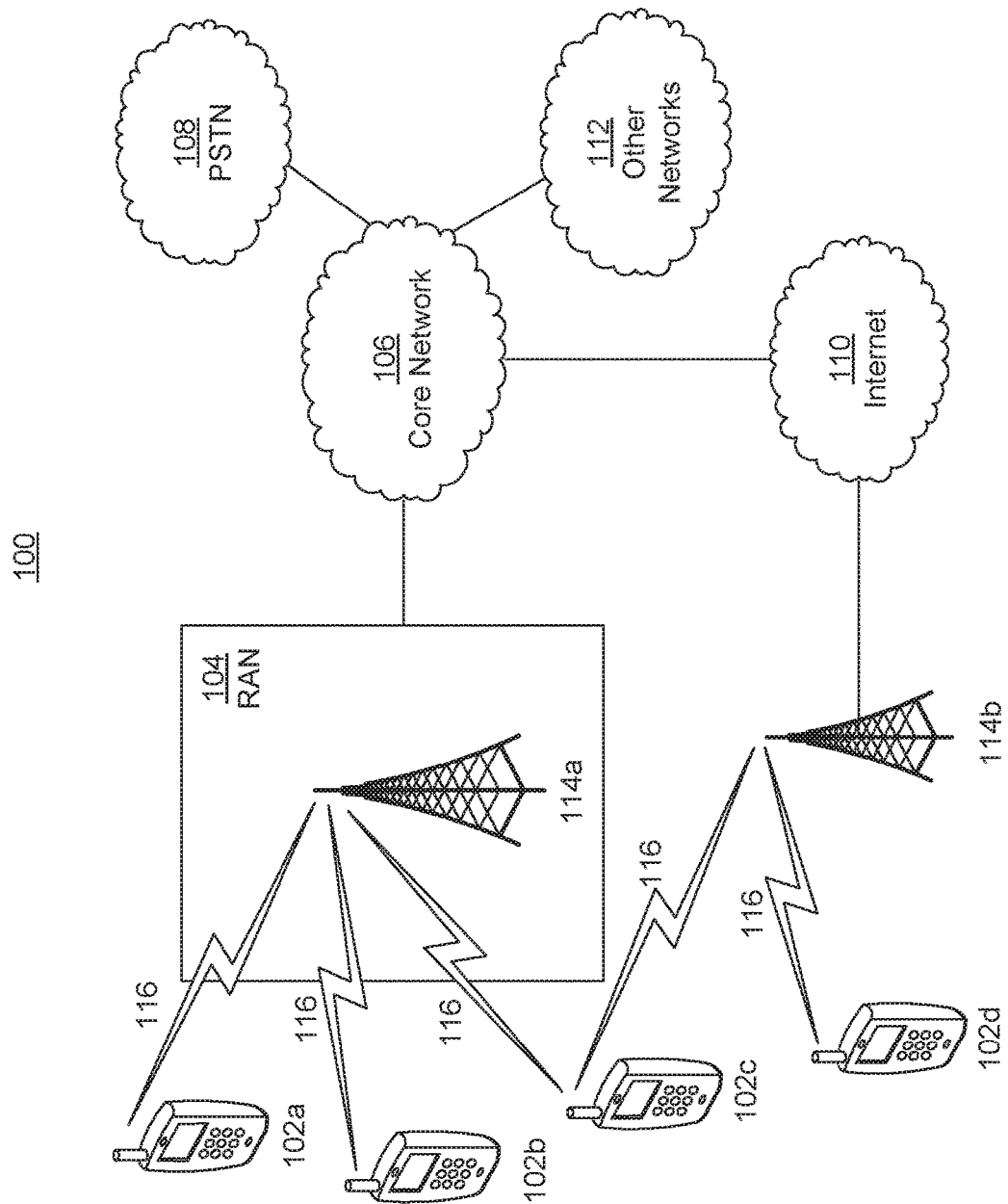
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the ON 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown), These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (\PLAN), In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the ON 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TOP), user datagram protocol (UDP) and/or the internet protocol (IP) in the TCP/IP internet protocol suite. The networks 112 may include wired and/or wireless communications networks owned and/or operated by other service providers. For example, the networks 112 may include another ON connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
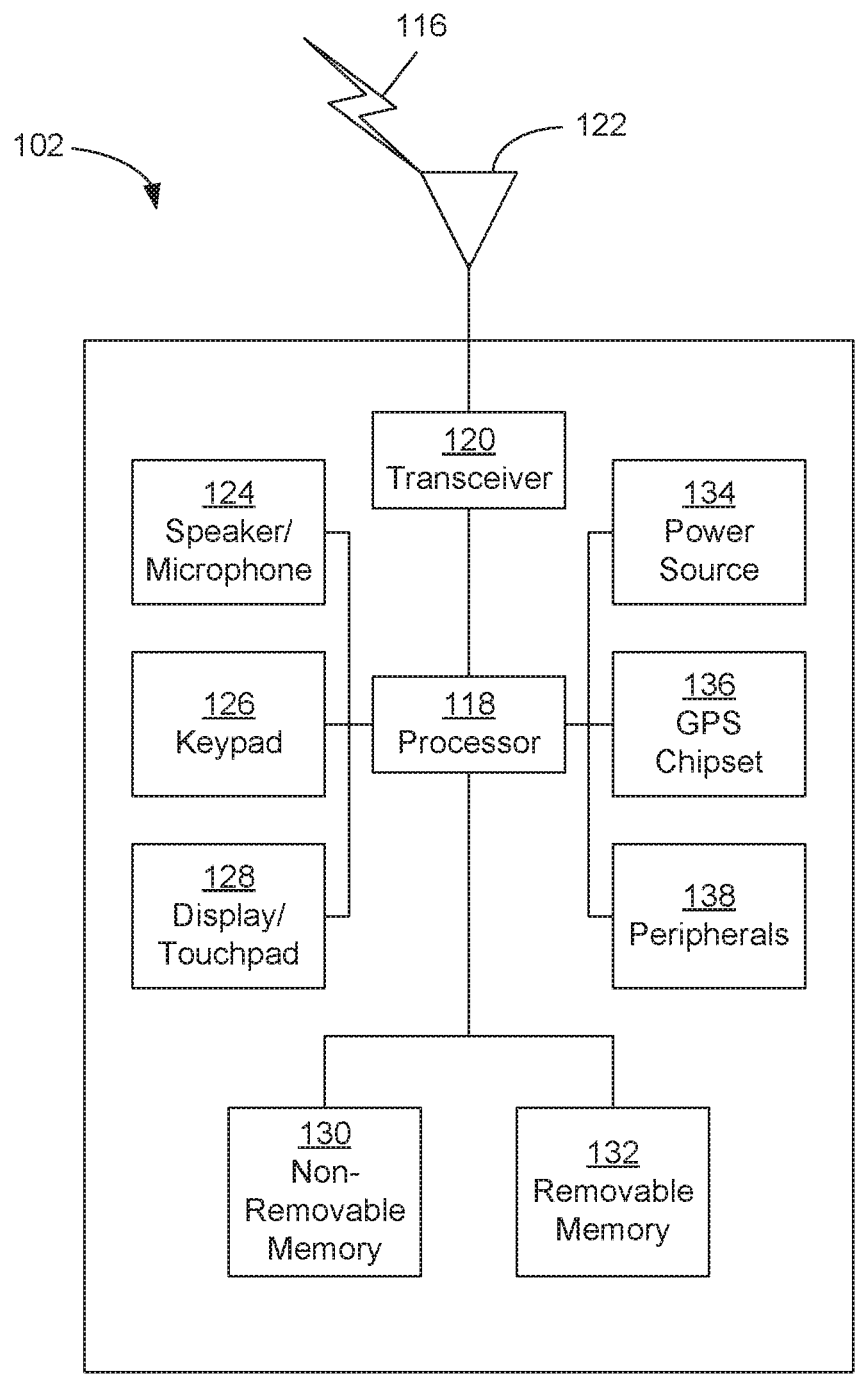
FIG. 1B is a system diagram illustrating an example wireless transmit/receive unit (WTRU) that may be used within the communications system illustrated in FIG. 1A according to an embodiment.
Figure 1C:
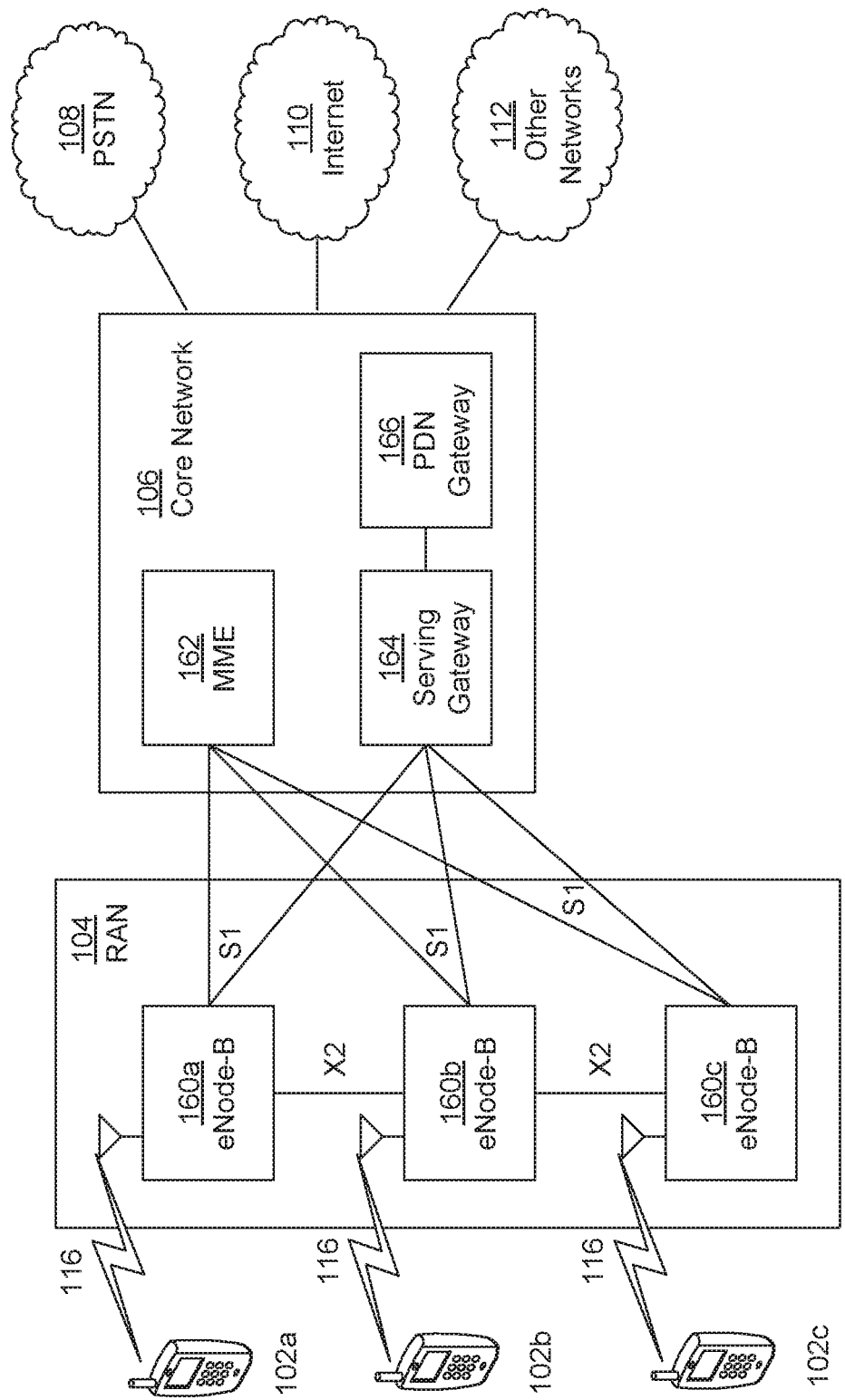
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122, More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122, As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (©LED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor: an altimeter, a light sensor, a touch sensor, a magnetometer, a barometer, a gesture sensor, a biometric sensor, and/or a humidity sensor.

Figure 10:
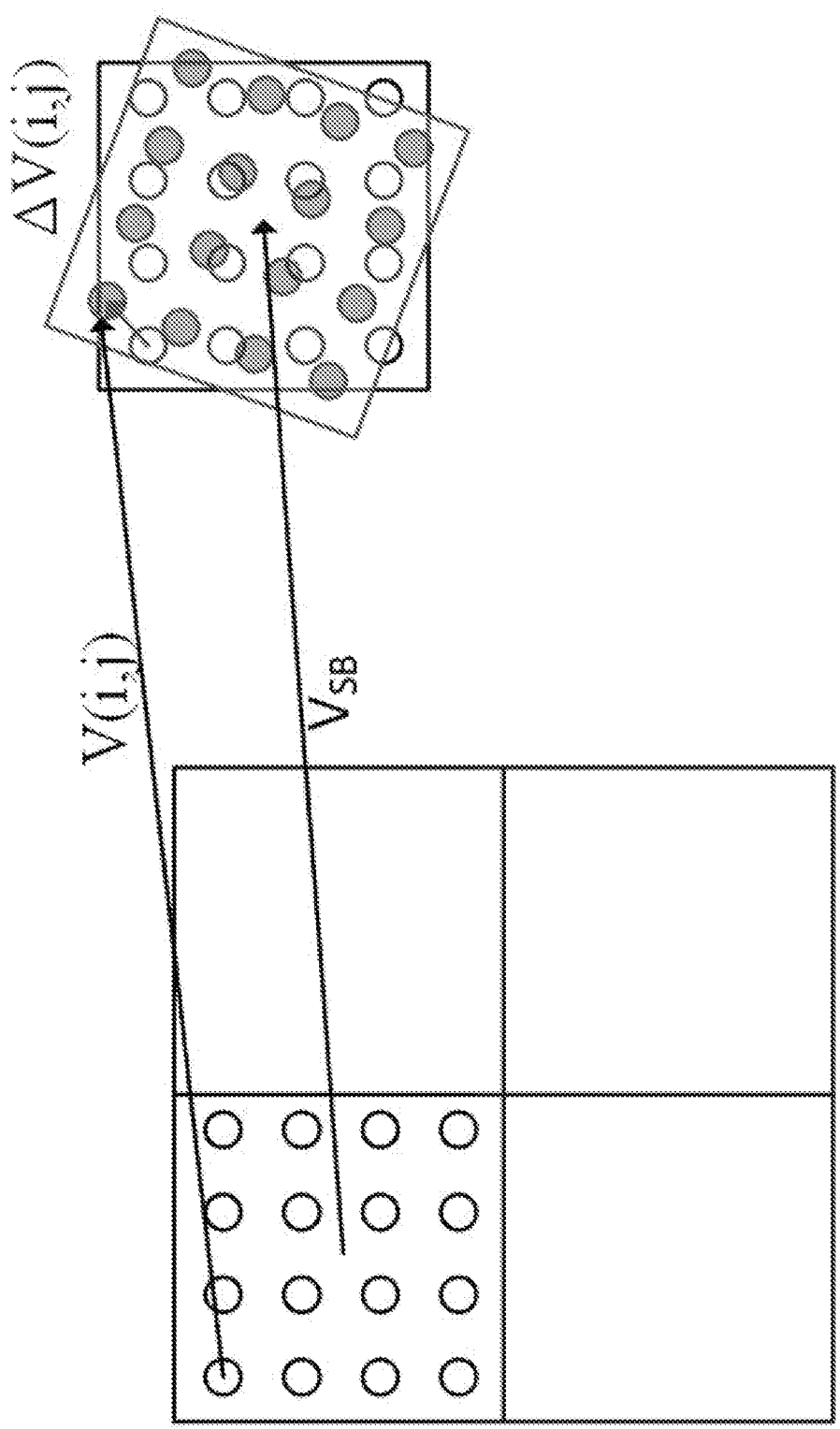
FIG. 10 illustrates an example sub-block MV ($V_{SB}$) and pixel $\Delta v(i,j)$.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)), FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the ON operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the ON 106 and the PSTN 108. In addition, the ON 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
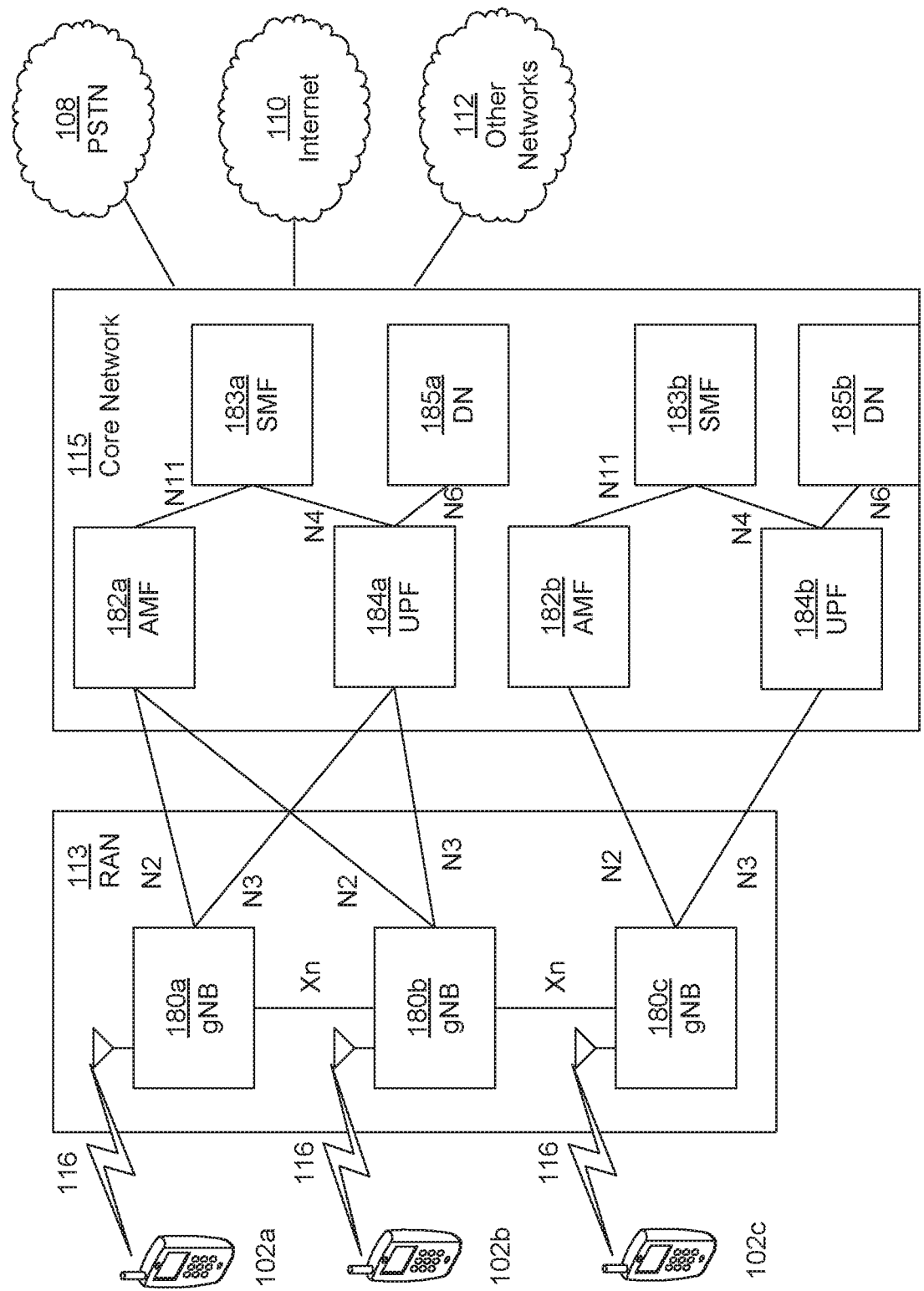
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the ON 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a. 183b, management of the registration area, termination of NAS signaling, mobility management, and the like. Network slicing may be used by the AMF 182a. 182b in order to customize ON support for WTRUs 102a, 102b, 102c based on the types of services being utilized WTRUs 102a, 102b, 102c, For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the ON 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b, and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples or embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-12 described herein may provide some embodiments, but other embodiments are contemplated. The discussion of FIGS. 5-12 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
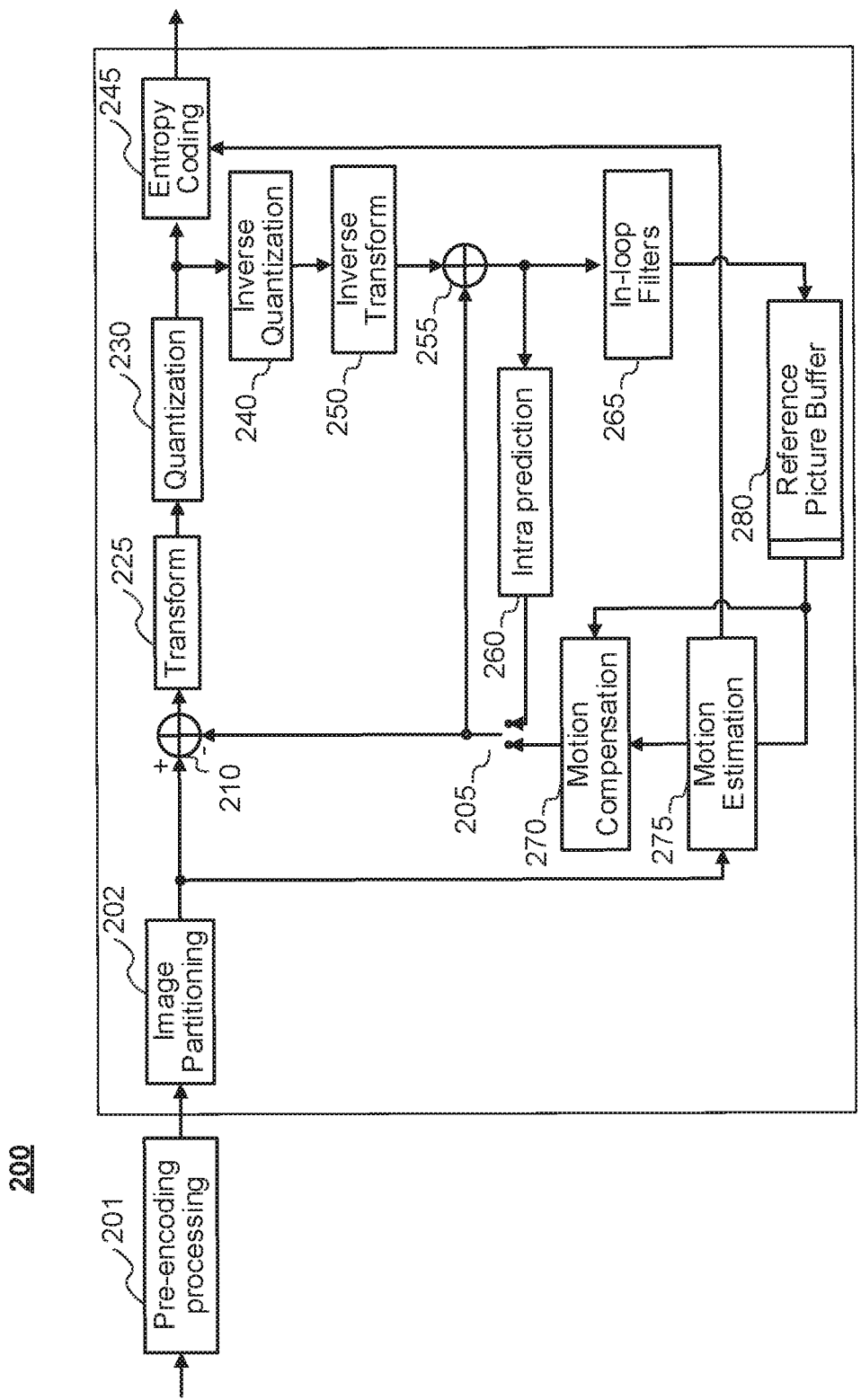
FIG. 2 is a diagram showing an example video encoder.
Figure 3:
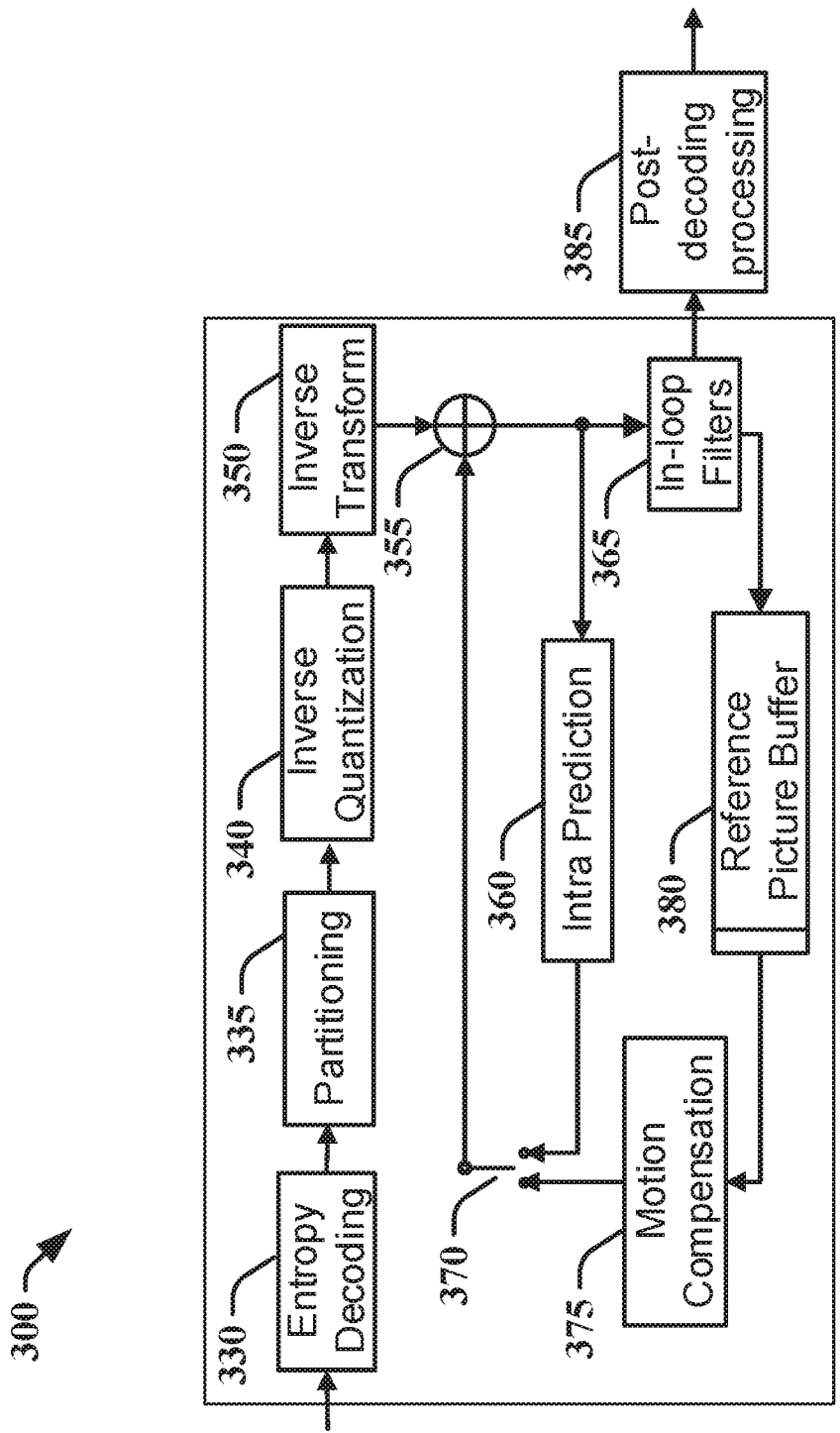
FIG. 3 is a diagram showing an example of a video decoder.

Various methods and other aspects described in this application may be used to modify modules, for example, intra prediction and entropy coding and/or decoding modules (260, 360, 245, 330), of a video encoder 200 and decoder 300 as shown in FIG. 2 and FIG. 3. Moreover, the subject matter disclosed herein presents aspects that are not limited to VVC or HEVC, and may be applied, for example, to any type, format or version of video coding, whether described in a standard or a recommendation, whether pre-existing or future-developed, and extensions of any such standards and recommendations (e.g., including VVC and HEVC). Unless indicated otherwise, or technically precluded, the aspects described in this application may be used individually or in combination.

Various numeric values are used in examples described the present application, such as weighting factors, such as $\{1/4, 1/8, 1/16, 1/32\}$ or $\{3/4, 7/8, 15/16, 31/32\}$, a filter, such as a 3-tap filter $[-1, 0, 1]$, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 may also generally perform video decoding as part of encoding video data. For example, the encoder 200 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
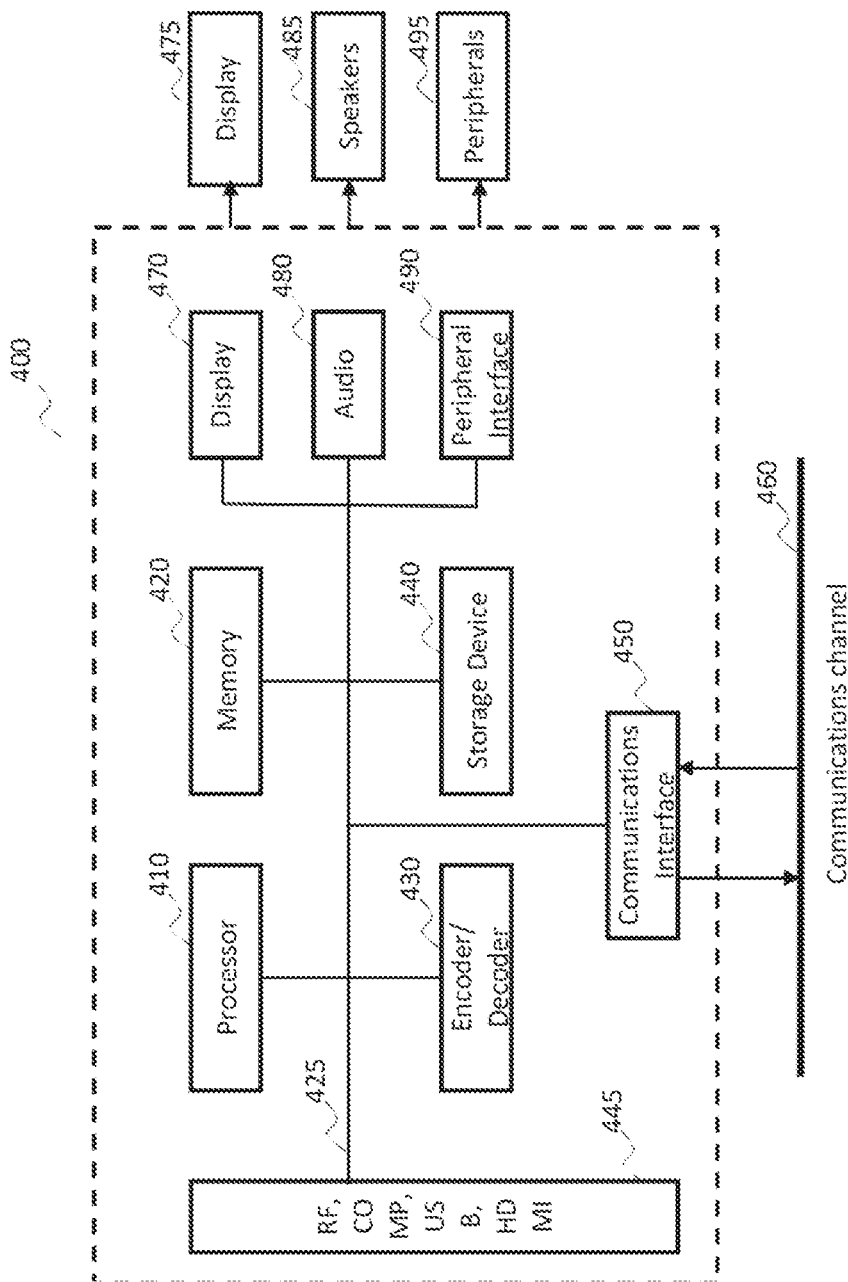
FIG. 4 is a diagram showing an example of a system in which various aspects and examples may be implemented.

FIG. 4 is a diagram showing an example of a system in which various aspects and embodiments described herein may be implemented. System 400 may be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers, Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various embodiments, the system 400 is communicatively coupled to one or more other systems, or other electronic devices, via, for example, a communications bus or through dedicated input and/or output ports. In various embodiments, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various embodiments, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 410 and/or the encoder/decoder module 430 is used to store instructions and to provide working memory for processing that is needed during encoding or decoding. In other embodiments, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as, for example, MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 400 may be provided through various input devices as indicated in block 445. Such input devices include, but are not limited to, (i) a radio frequency (RE) portion that receives an RE signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various embodiments, the input devices of block 445 have associated respective input processing elements as known in the art. For example, the RE portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain embodiments, (iv) demodulating the downconverted and band-limited signal, (v) performing error correction, and (vi) demultiplexing to select the desired stream of data packets. The RE portion of various embodiments includes one or more elements to perform these functions, for example, frequency selectors, signal selectors, band-limiters, channel selectors, filters, downconverters, demodulators, error correctors, and demultiplexers. The RE portion can include a tuner that performs various of these functions, including, for example, downconverting the received signal to a lower frequency (for example, an intermediate frequency or a near-baseband frequency) or to baseband. In one set-top box embodiment, the RE portion and its associated input processing element receives an RE signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various embodiments, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these embodiments is typically connected to an access point or router that provides access to external networks including the Internet for allowing streaming applications and other over-the-top communications. Other embodiments provide streamed data to the system 400 using a set-top box that delivers the data over the HDMI connection of the input block 445. Still other embodiments provide streamed data to the system 400 using the RF connection of the input block 445. As indicated above, various embodiments provide data in a non-streaming manner. Additionally, various embodiments use wireless networks other than Wi-Fi, for example a cellular network or a Bluetooth network.

The system 400 can provide an output signal to various output devices, including a display 475, speakers 485, and other peripheral devices 495. The display 475 of various embodiments includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples of embodiments, one or more of a stand-alone digital video disc (or digital versatile disc) (DVR, for both terms), a disk player, a stereo system, and/or a lighting system. Various embodiments use one or more peripheral devices 495 that provide a function based on the output of the system 400. For example, a disk player performs the function of playing the output of the system 400.

In various embodiments, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various embodiments, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various embodiments in which the display 475 and speakers 485 are external components, the output signal may be provided via dedicated output connections, including, for example, HDMI ports, USB ports, or COMP outputs.

The embodiments may be carried out by computer software implemented by the processor 410 or by hardware, or by a combination of hardware and software. As a non-limiting example, the embodiments may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding, "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decoding a block comprising a current sub-block based on a sample value obtained for a first pixel, which may be obtained based on, for example, a motion vector (MV) for a current sub-block, an MV for a sub-block adjacent to the current sub-block, and a sample value for a second pixel adjacent to the first pixel, etc.

As further embodiments, in one example "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, encoding a block comprising a current sub-block based on a sample value obtained for a first pixel, which may be obtained based on, for example, a motion vector (MV) for a current sub-block, an MV for a sub-block adjacent to the current sub-block, and a sample value for a second pixel adjacent to the first pixel, etc.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment," "an embodiment," "an example," "one implementation" or "an implementation," as well as other variations thereof, means that a particular feature, structure, characteristic, and so forth described in connection with the embodiment is included in at least one embodiment. Thus, the appearances of the phrase "in one embodiment," "in an embodiment," "in an example," "in one implementation," or "in an implementation", as well any other variations, appearing in various places throughout this application are not necessarily all referring to the same embodiment or example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information, Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B. and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill n this and related arts, for as many items as are listed.

Also, as used herein, the word "signal" refers to, among other things, indicating something to a corresponding decoder. For example, in some embodiments the encoder signals (e.g., to a decoder) a weight index, etc. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described embodiment, Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Bi-directional motion compensated prediction (MCP) may be performed. MCP may result in high efficiency in removing temporal redundancy, for example, by exploiting temporal correlations between pictures. A bi-prediction signal may be formed, for example, by combining two uni-prediction signals (for example, using a weight value equal to 0.5). Combining uni-prediction signals may be sub-optimal, for example, when illuminance changes rapidly from one reference picture to another. Prediction techniques may compensate for the illuminance variation over time, for example, by applying global or local weights and/or offset values to one or more (for example, each) of the sample values in reference pictures.

Coding modules (for example, associated with temporal prediction) may be extended and/or enhanced, Affine motion compensation may be used as an inter-coding tool.

Implementations using an affine mode may be described herein. A translation motion model may be applied for motion-compensated prediction. There may be many kinds of motion (for example, zoom in or out, rotation, perspective motions, and/or other irregular motions). A simplified affine transform motion-compensated prediction may be applied. A flag for inter-coded CUs (for example, each inter-coded CU) may be signaled, for example, to indicate whether a translation motion or affine motion model is applied for inter prediction, A flag may be signaled (for example, if affine motion is used) to indicate the number of parameters used in an affine motion model (for example, four or six).

Figure 5:
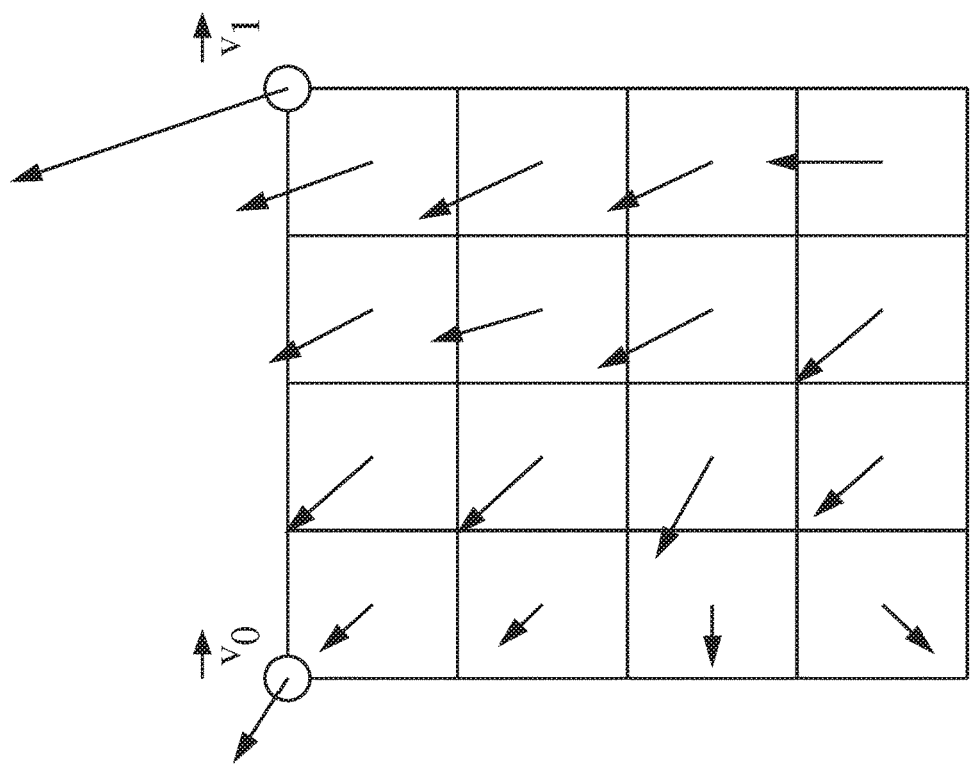
FIG. 5 illustrates an example four parameter affine mode model and sub-block level motion derivation for affine blocks.
Figure 5:
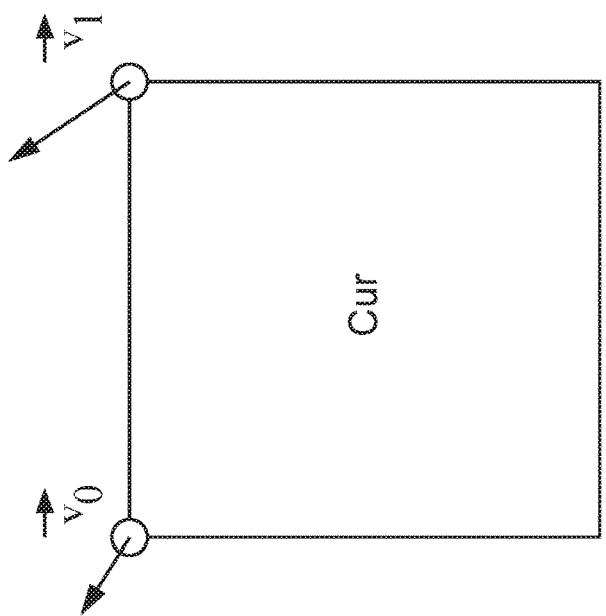

An affine motion model may be a four-parameter model. Two parameters may be used for translation movement (for example, one for each of the horizontal and vertical directions). One parameter may be used for zoom motion. One parameter may be used for rotation motion. A horizontal zoom parameter may be equal to a vertical zoom parameter. A horizontal rotation parameter may be equal to a vertical rotation parameter. A four-parameter motion model may be coded using two motion vectors (MVs) as a (for example, one) pair at two control point positions defined at the top-left corner and top-right corner of a current CU. FIG. 5 illustrates an example four parameter affine mode model and sub-block level motion derivation for affine blocks. As shown in FIG. 5, an affine motion field of a block may be described by two control point motion vectors ($V_0$, $V_1$). Based on control point motion, a motion field ($v_x$, $v_y$) may be described, for example, according to Equation 1:

$$v_x = \frac{(v_{1x} - v_{0x})}{w}x - \frac{(v_{1y} - v_{0y})}{w}y + v_{0x} \quad (1)$$

$$v_y = \frac{(v_{1y} - v_{0y})}{w}x + \frac{(v_{1x} - v_{0x})}{w}y + v_{0y}$$

where ($v_{0x}$, $v_{0y}$) may be a motion vector of the top-left corner control point, ($v_{1x}$, $v_{1y}$) may be a motion vector of the top-right corner control point, as shown in FIG. 5, and w may be the width of the CU.

Figure 6:
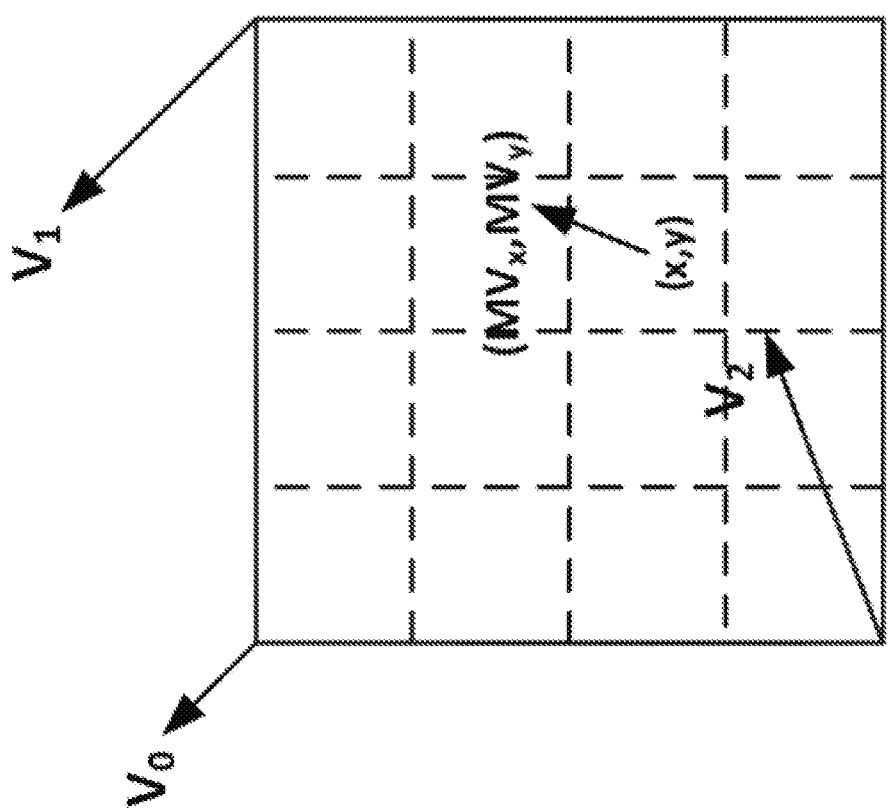
FIG. 6 illustrates an example six parameter affine mode where $V_0$, $V_1$, and $V_2$ are control points and ($MV_x$, $MV_y$) is a motion vector of a sub-block centered at position (x, y).

An affine motion model may be a six-parameter model. Two parameters may be used for translation movement (for example, one for each of the horizontal and vertical directions). Two parameters may be used for zoom motion (for example, one for each of the horizontal and vertical directions). Two parameters may be used for rotation motion (for example, one for each of the horizontal and vertical directions). The six-parameter motion model may be coded with three MVs at three control points. FIG. 6 illustrates an example six parameter affine mode where $V_0$, $V_1$, and $V_2$ are control points and ($MV_x$, $MV_y$) is a motion vector of a sub-block centered at position (x, y). As shown in FIG. 6, the control points for a six-parameter affine coded CU may be defined at the top left, top right, and bottom left corners of the CU. The motion at the top left control point may be related to translation motion. The motion at the top right control point may be related to rotation and zoom motion in the horizontal direction. The motion at the bottom left control point may be related to rotation and zoom motion in the vertical direction. The rotation and zoom motion in the horizontal direction may be different from the motion in the vertical direction. The MV of a sub-block (for example, each sub-block) ($v_x$, $v_y$) may be derived using three MVs at control points, for example, according to Equations 2 and 3:

$$v_x = v_{0x} + (v_{1x} - v_{0x}) * \frac{x}{w} + (v_{2x} - v_{0x}) * \frac{y}{h} \quad (2)$$

$$v_y = v_{0y} + (v_{1y} - v_{0y}) * \frac{x}{w} + (v_{2y} - v_{0y}) * \frac{y}{h} \quad (3)$$

where ($v_{2x}$, $v_{2y}$) may be the motion vector of the bottom-left control point, (x, y) may be the center position of the sub-block, and w and h may be the width and height of the CU, respectively.

A motion field for a block coded with an affine motion model may be derived based on, for example, the granularity of a sub-block. An MV of a (for example, each) sub-block may be derived, for example, by calculating a MV of the center sample of the sub-block (for example, as shown in FIG. 5) (for example, according to Eq. (1)). A calculation may be rounded, for example, to $\frac{1}{16}$-pel accuracy. The derived MVs may be used at the motion compensation stage to generate a prediction signal of the sub-block (for example, each sub-block) inside the current block. The sub-block size applied for affine motion compensation may be, for example, 4×4, The four parameters of the 4-parameter affine model may be estimated, for example, iteratively. For example, one or more MV pairs at step k may be denoted as $\{(v_{0x}^k, v_{0y}^k), (v_{1x}^k, v_{1y}^k)\}$. An original luminance signal may be denoted as I(i,j). A prediction luminance signal may be denoted as I'$_k$(i,j). Spatial gradients $g_x$(i,j) and $g_y$(i,j) may be derived, for example, with a Sobel filter applied on the prediction signal I'$_k$(i,j) in the horizontal and vertical directions, respectively. The derivative of Equation (1) may be represented, for example, according to Equation 4:

$$\begin{cases} dv_x^k(x,y) = c*x - d*y + a \\ dv_y^k(x,y) = d*x + c*y + b \end{cases} \quad (4)$$

where (a, b) may be delta translation parameters, and (c, d) may be delta zoom and rotation parameters at step k. The delta MV at control points may be derived with coordinates, for example, according to Equations 5 and 6. For example, (0, 0) and (w, 0) may be coordinates for the top-left and top-right control points, respectively, $$\begin{cases} dv_{0x}^k = v_{0x}^{k+1} - v_{0x}^k = a \\ dv_{0y}^k = v_{0y}^{k+1} - v_{0y}^k = b \end{cases} \quad (5)$$

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases} \quad (6)$$

The relationship between the change of luminance and the spatial gradient and temporal movement may be formulated, for example, according to Equation 7:

$$I'_k(i,j) - I(i,j) = g_x(i,j)*dv_x^k(i,j) + g_y(i,j)*dv_y^k(i,j) \quad (7)$$

where $dv_x^k(i,j)$ and $dv_y^k(i,j)$ may be substituted with the values in Equation (4), for example, to obtain an equation for parameters (a, b, c, d), for example, as shown in Equation 8:

$$I'_k(i,j) - I(i,j) = (g_x(i,j)*i + g_y(i,j)*j)*c + (-g_x(i,j)*j + g_y(i,j) \\ *i)*d + g_x(i,j)*a + g_y(i,j)*b \quad (8)$$

The parameter set (a, b, c, d) may be derived, for example, using the least square method (for example, since the samples in the CU satisfy Equation 8). The MVs at the control points $\{(v_{0x}^{k+1}, v_{0y}^{k+1}), (v_{1x}^{k+1}, v_{1y}^{k+1})\}$ at step (k+1) may be solved with Equations 5 and 6, and they may be rounded to a specific precision (for example, ¼ pel). The MVs at two control points may be refined (for example, using iteration) until parameters (a, b, c, d) are (for example, all) zero or the number of times the iteration has been performed reaches a (for example, pre-defined) limit.

The six parameters of a six-parameter affine model may be estimated. Equation 4 may be changed, for example, according to Equation 9:

$$\begin{cases} dv_x^k(x,y) = c*x + d*y + a \\ dv_y^k(x,y) = e*x + f*y + b \end{cases} \quad (9)$$

where (a, b) may be delta translation parameters, (c, d) may be delta zoom and rotation parameters for the horizontal direction, and (e, f) may be delta zoom and rotation parameters for the vertical direction, at step k. Equation 8 may be changed, for example, according to Eq. 10:

$$I'_k(i,j) - I(i,j) = (g_x(i,j)*i)*c + (g_x(i,j)*j)*d + (g_y(i,j)*i)*e + \\ (g_y(i,j)*j)*f + g_x(i,j)*a + g_y(i,j)*b \quad (10)$$

The parameter set (a, b, c, d, e, f) may be derived, for example, using a least square method, for example, by considering a sample (for example, the samples) within a CU. The MV of the top left control point $(v_{0x}^{k+1}, v_{0y}^{k+1})$ may be calculated using Equation 5. The MV of the top right control point $(v_{1x}^{k+1}, v_{1y}^{k+1})$ and the MV of the bottom left control point $(v_{2x}^{k+1}, v_{2y}^{k+1})$ may be calculated, for example, according to Equations 11 and 12:

$$\begin{cases} dv_{1x}^k = (v_{1x}^{k+1} - v_{1x}^k) = c*w + a \\ dv_{1y}^k = (v_{1y}^{k+1} - v_{1y}^k) = e*w + b \end{cases} \quad (11)$$

$$\begin{cases} dv_{2x}^k = (v_{2x}^{k+1} - v_{2x}^k) = d*h + a \\ dv_{2y}^k = (v_{2y}^{k+1} - v_{2y}^k) = f*h + b \end{cases} \quad (12)$$

Figure 7:
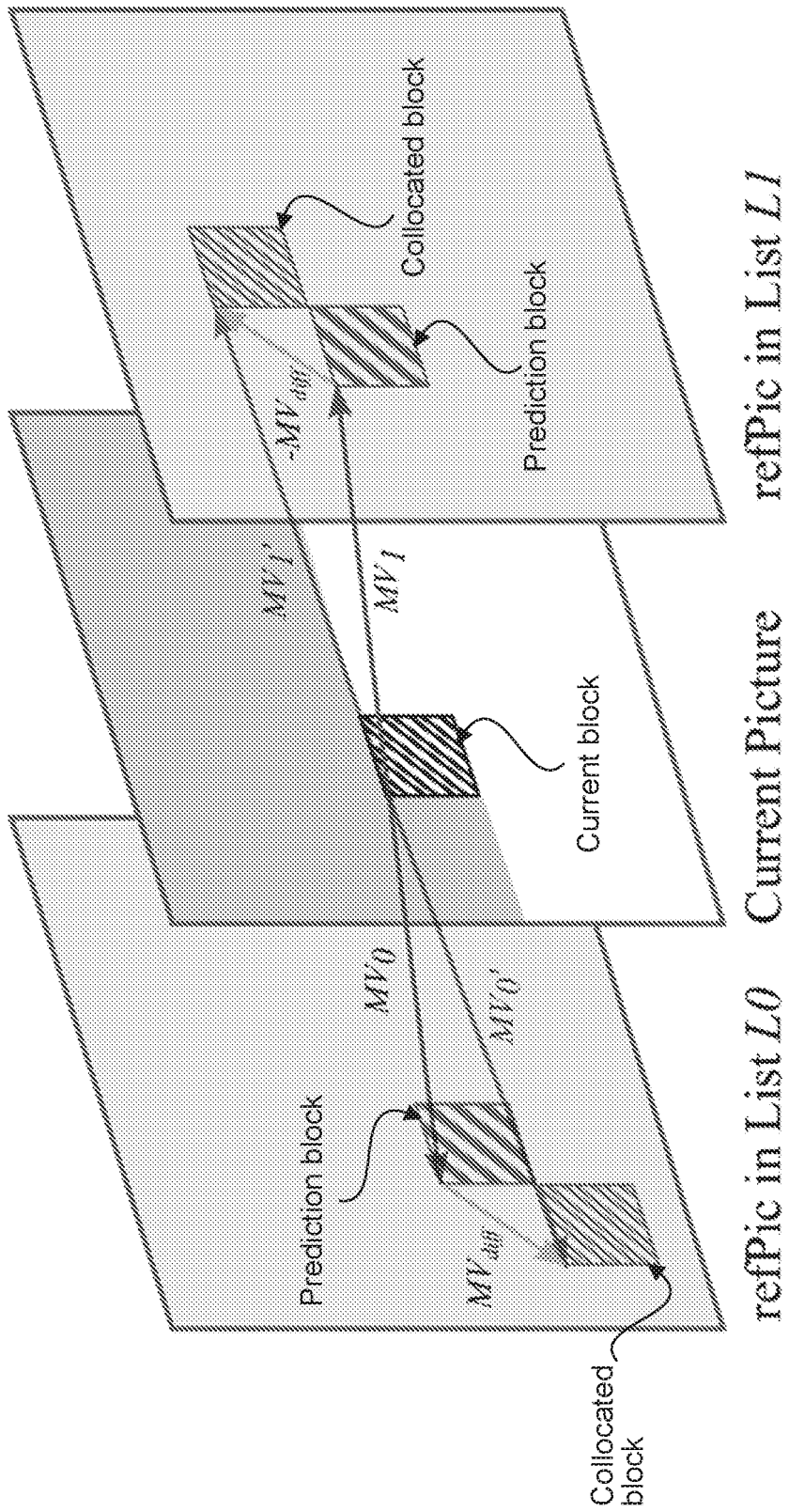
FIG. 7 illustrates an example decoding side motion vector (MV) refinement.

Decoder side motion vector refinement (DMVR) may be provided. A bilateral-matching (BM) based DMVR may be applied, for example, to increase the accuracy of the MVs of the merge mode. In bi-prediction operation, a refined MV may be searched around the initial MVs in the reference picture list L0 and/or reference picture list L1. The BM based DMVR may calculate the distortion between the two candidate blocks in the reference picture list LU and list L1. FIG. 7 illustrates an example decoding side motion vector (MV) refinement. As illustrated in FIG. 7, a sum of absolute difference (SAD) between the collocated blocks may be calculated, for example, based on one or more (for example, each) MV candidate around the initial MV. The MV candidate with the lowest SAD may become the refined MV and may be used to generate the bi-predicted signal.

The refined MV derived by DMVR may be used, for example, to generate the inter prediction samples. The refined MV derived by DMVR may be used in temporal motion vector prediction, for example, for future pictures coding. An initial MV may be used in deblocking and/or spatial motion vector prediction for future CU coding, for example, to avoid any MV dependency between a current CU and a neighboring CU.

As shown in FIG. 7, the search points that surround the initial MV and the MV offset may obey the MV difference mirroring (for example, symmetric) rule. Points that are checked by DMVR, denoted by candidate MV pair (MV0, MV1), may be in accordance with Equation 13 and/or Equation 14:

$$\begin{cases} MV0' = MV0 + MV_{offset} \\ MV1' = MV1 - MV_{offset} \end{cases} \quad (13) \\ (14)$$

$MV_{offset}$ may represent a refinement offset between the initial MV and the refined MV in one of the reference pictures. A refinement search range may be, for example, two integer luma samples from the initial MV. A fast searching method with an early termination mechanism may be applied, for example, to reduce the search complexity.

Subblock-based temporal motion vector prediction (SbTMVP) may be provided. SbTMVP may use the motion field in the collocated picture to improve motion vector prediction and merge mode for CUs in the current picture. The same collocated picture used by temporal motion vector prediction (TMVP) may be used for SbTMVP. SbTMVP may differ from TMVP in one or more of the following aspects. TMVP may predict motion at the CU level. SbTMVP may predict motion at the sub-CU level. TMVP may fetch the temporal motion vectors from a collocated block in a collocated picture. The collocated block may be the bottom-right or center block relative to a current CU. SbTMVP may apply a motion shift, for example, before fetching the temporal motion information from the collocated picture. The motion shift may be obtained from a motion vector, for example, from one of the spatial neighboring blocks of the current CU.

Figure 8A:
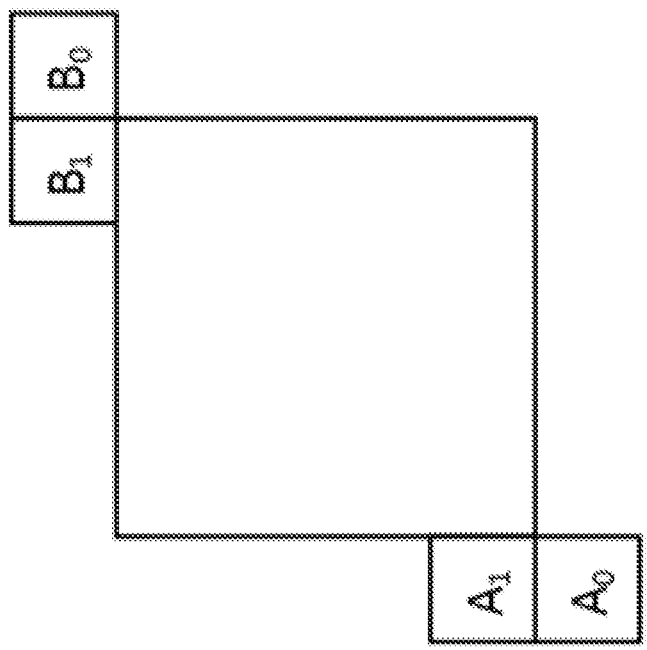
FIG. 8A illustrates an example of spatial neighboring blocks that may be used by subblock-based temporal motion vector prediction (SbTMVP).
Figure 8B:
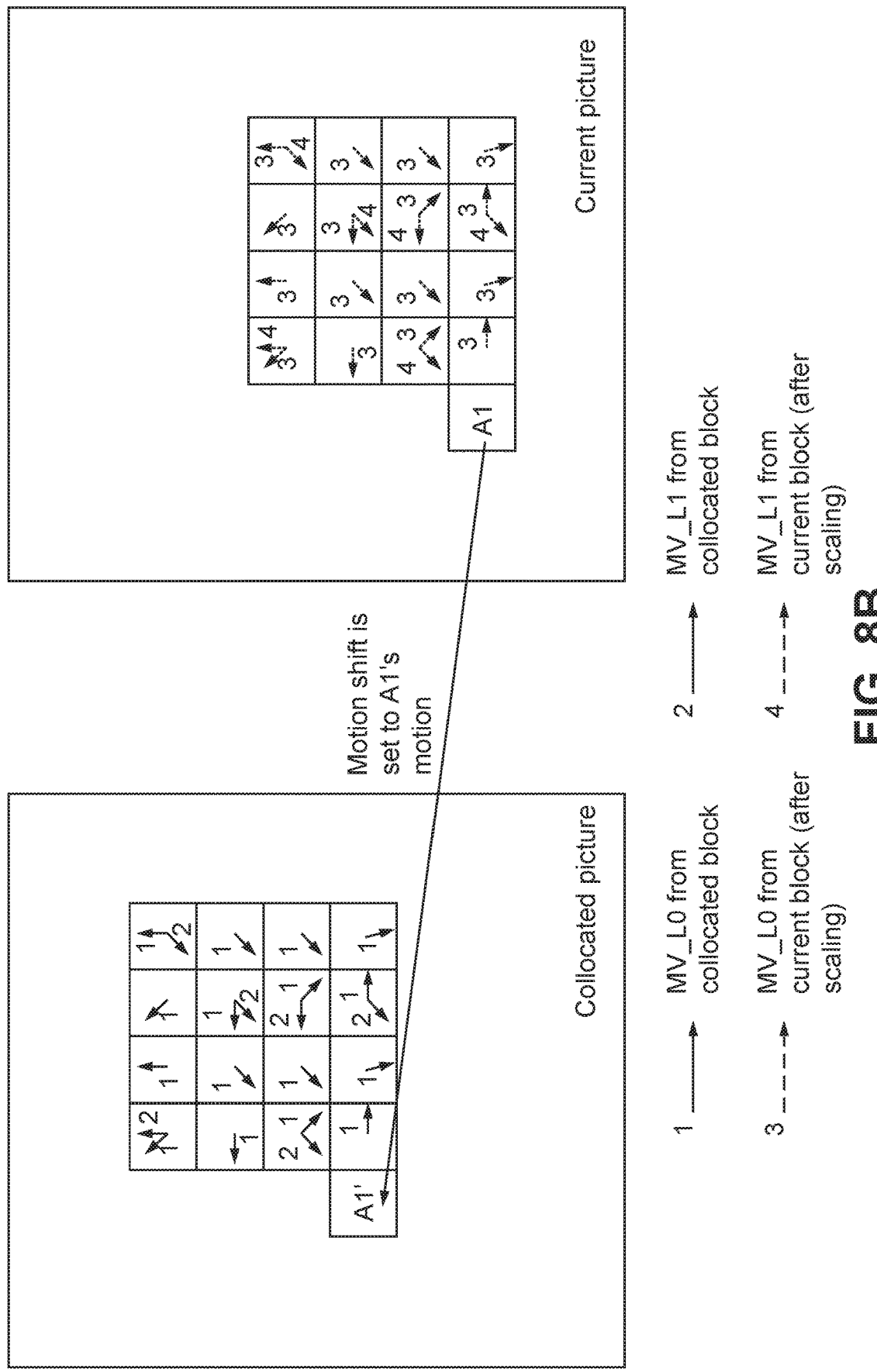
FIG. 8B illustrates an example derivation of sub-coding unit (CU) motion field.

FIGS. 8A and 8B illustrate an example SbTMVP process. FIG. 8A illustrates example spatial neighboring blocks that may be used in SbTMVP, FIG. 8B illustrates an example derivation of sub-coding unit (CU) motion field. As illustrated in FIG. 8B, a sub-CU motion field may be derived by applying a motion shift from a spatial neighbor and scaling the motion information from the corresponding collocated sub-CUs. SbTMVP may predict the motion vectors of the sub-CUs within the current CU. A spatial neighbor (for example, A1 in FIG. 8A) may be examined. A motion vector for A1 may be selected (for example, for the motion shift to be applied), for example, if A1 has a motion vector that uses the collocated picture as its reference picture. The motion shift may be selected as (0, 0), for example, if no motion is identified. The selected motion shift may be applied, for example, to obtain sub-CU-level motion information (for example, such as motion vectors and/or reference indices) from the collocated picture. For example, the selected motion shift may be added to the current block's coordinates. The motion shift may be set to block A1's motion (for example, in the example depicted by FIG. 8B). The motion information of a (for example, each) sub-CU's corresponding block (for example, the smallest motion grid that covers the center sample) in the collocated picture may be used to derive the motion information for the sub-CU, The motion information of the collocated sub-CU (for example, after being identified) may be converted to the motion vectors and reference indices of the current sub-CU. For example, temporal motion scaling may be applied to align the reference pictures of the temporal motion vectors to those of the current CU.

A combined sub-block-based merge list that includes the SbTMVP candidate and affine merge candidates may be used for the signalling of sub-block based merge mode. The SbTMVP mode may be enabled and/or disabled by a sequence parameter set (SPS) flag. If the SbTMVP mode is enabled, the SbTMVP predictor may be added as an (for example, the first) entry of the list of sub-block-based merge candidates and may be followed by the affine merge candidates. The size of a sub-block-based merge list may be signalled in an SPS. A maximum allowed size of the sub-block-based merge list may be 5, for example.

The sub-CU size used in SbTMVP may be fixed, for example, at 8×8. SbTMVP mode may (for example, only) be applicable to a CU with a width and height larger than or equal to 8.

The encoding logic of the additional SbTMVP merge candidate may be the same as encoding logic for other merge candidates. For example, for each CU in P or B slice, an additional RD check may be performed. The additional RD check(s) may be used to decide whether to use the SbTMVP candidate.

Figure 9:
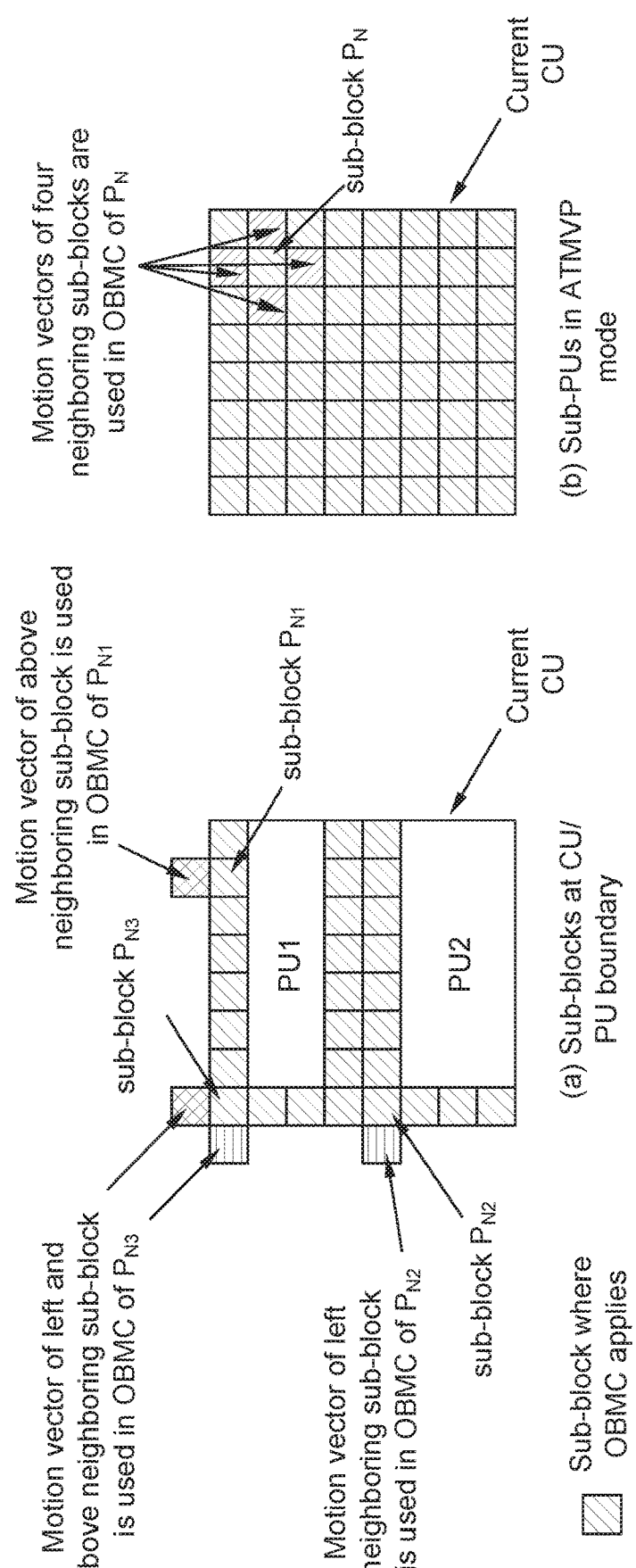
FIG. 9 illustrates example sub-blocks where overlapped block motion compensation (OBMC) applies.

Overlapped Block Motion Compensation (OBMC) may be provided. OBMC may be switched on and off, for example, using syntax at the CU level. OBMC may be performed for motion compensation (MC) block boundaries (for example, except the right and bottom boundaries of a CU). OBMC may be applied for luma and chroma components. An MC block may correspond to a coding block. A CU may be coded with a sub-CU mode (for example, includes sub-CU merge, affine, and FRUC mode). One or more sub-blocks (for example, each subblock) of a CU coded with a sub-CU mode may be an MC block. OBMC may be performed at a sub-block level for (for example, all) MC block boundaries, for example, to (for example, uniformly) process CU boundaries. FIG. 9 illustrates an example of sub-blocks where OBMC applies. Sub-block size may be set equal to 4×4, for example, as illustrated in FIG. 9.

OBMC may be applied to a current sub-block. Motion vectors (for example, besides current motion vectors) of four connected neighboring sub-blocks (for example, if available and not identical to the current motion vector) may be used to derive a prediction block for the current sub-block. In one or more examples, "neighboring" may be used interchangeably with "adjacent". The multiple prediction blocks based on multiple motion vectors may be combined, for example, to generate a final prediction signal of the current sub-block.

A prediction block based on motion vectors of a neighboring sub-block may be denoted as $P_N$, with N indicating an index for the neighboring sub-blocks above, below, left and right of a current sub-block. A prediction block based on motion vectors of the current sub-block may be denoted as $P_C$. OBMC may be skipped, for example, if $P_N$ is based on the motion information of a neighboring sub-block that includes the same motion information as the current sub-block, Otherwise, one or more (for example, each) sample of $P_N$ may be added to the same sample in $P_C$, for example, four rows/columns of $P_N$ may be added to $P_C$. In examples, the weighting factors $\{1/4, 1/8, 1/16, 1/32\}$ may be used for $P_N$ and the weighting factors $\{3/4, 7/8, 15/16, 31/32\}$ may be used for $P_C$. Two rows and/or columns of $P_N$ may be added to $P_C$ for small MC blocks, for example, if the height or width of the coding block is equal to four (4) or a CU is coded with sub-CU mode. For small MC blocks, weighting factors $\{1/4, 1/8\}$ may be used for $P_N$ and weighting factors $\{3/4, 7/8\}$ may be used for $P_C$. For $P_N$ generated based on motion vectors of a vertically (for example, and/or horizontally) neighboring sub-block, samples in the same row (for example, and/or column) of $P_N$ may be added to $P_C$ with the same weighting factor. For example, the overlapped area pixels may use a weighting factor different from a weighting factor used for non-overlapped area pixels.

A CU level flag may be signalled to indicate whether OBMC is applied for the current CU, for example, for a CU size less than or equal to 256 luma samples. OBMC may be applied by default, for example, for CUs that have a size larger than 256 luma samples or that are not coded with AMVP mode. The impact of OMBC may be taken into account at the encoder, for example, during the motion estimation stage. The prediction signal formed by OBMC using motion information of the top neighboring block and the left neighboring block may be used to compensate the top and left boundaries of the original signal of the current CU. A (for example, normal) motion estimation process may (for example, otherwise) be applied (for example, thereafter).

Prediction refinement with optical flow (PROF) may be applied to affine mode. PROF may refine the sub-block based affine motion compensated prediction with optical flow, for example, to achieve a finer granularity of motion compensation. A luma prediction sample may be refined (for example, after sub-block based affine motion compensation), for example, by adding a difference derived by the optical flow equation. PROF may include one or more of the following. The sub-block-based affine motion compensation may be performed to generate sub-block prediction ((i,j). The spatial gradients $g_x(i,j)$ and $g_y(i,j)$ of the sub-block prediction may be calculated at one or more sample locations (for example, each sample location). For example, a spatial gradient may be calculated using one or more pixels that may or may not be partially or wholly contiguous. In an example, a gradient for a first pixel may be based on a sample value for a second pixel and a sample value for a third pixel, where the second and third pixels are adjacent to the first pixel. In some examples, the first pixel for which a gradient is calculated may abut either one or both of the second or third pixels that are adjacent to the first pixel. In other examples, the first pixel for which a gradient is calculated may be near but not abut either one or any of the second or third pixels that are adjacent to the first pixel. The calculations may be performed using a 3-tap filter, such as [−1, 0, 1], for example, as shown in Equations 15 and 16:

$$g_x(i,j)=I(i+1,j)-I(i-1,j) \quad (15)$$

$$g_y(i,j)=I(i,j+1)-I(i,j-1) \quad (16)$$

A sub-block prediction may be extended (for example, by one pixel on each side) for the gradient calculation. The pixels on the extended borders may be copied from the nearest integer pixel position in the reference picture, for example. Additional interpolation for a padding region may be avoided, for example, if pixels on the extended borders are copied from the nearest integer pixel position in the reference picture. FIG. 10 depicts an example sub-block MV $V_{SB}$ and pixel $\Delta v(i,j)$. The luma prediction refinement may be calculated by an optical flow equation, for example, as shown in Equation 17:

$$\Delta I(i,j)=g_x(i,j)*\Delta v_x(i,j)+g_y(i,j)*\Delta v_y(i,j) \quad (17)$$

where the $\Delta v(i,j)$ is the difference between the pixel MV computed for sample location (i,j), denoted by v(i,j), and the sub-block MV of the sub-block to which pixel (i,j) belongs, as shown in FIG. 10.

The affine model parameters and the pixel location relative to the sub-block center may not change from sub-block to sub-block. The $\Delta v(i,j)$ may be calculated for a (for example, the first) sub-block, and may be reused for other sub-blocks (for example, in the same CU). Let x and y be the horizontal and vertical offset from the pixel location to the center of the sub-block, $\Delta v(x,y)$ may be derived, for example, according to Equation 18:

$$\begin{cases} \Delta v_x(x, y) = c*x + d*y \\ \Delta v_y(x, y) = e*x + f*y \end{cases} \quad (18)$$

where, for a 4-parameter affine model, c and e may be determined according to Equation 19:

$$\begin{cases} c = f = \dfrac{v_{1x} - v_{0x}}{w} \\ e = -d = \dfrac{v_{1y} - v_{0y}}{w} \end{cases} \quad (19)$$

where, for a 6-parameter affine model, c, d, e and f may be determined according to Equation 20:

$$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases} \quad (20)$$

and where ($v_{0x}$, $v_{0y}$), ($v_{1x}$,$v_{1y}$), ($v_{2x}$,$v_{2y}$) are the top-left, top-right and bottom-left control point motion vectors, respectively, and w and h are the width and height of the CU. The luma prediction refinement may be added to the sub-block prediction I(i,j). The final prediction I' may be generated, for example, according to Equation 21:

$$I'(i,j)=I(i,j)+\Delta I(i,j) \quad (21)$$

DMVR and SbTMVP may be used in different prediction modes to increase the accuracy of predicted MVs. The refined MVs after DMVR or SbTMVP may be used (for example, only) to subsequently perform sub-block-based motion compensation. OBMC may include a pixel level refinement. OBMC may be used to reduce boundary discontinuity at sub-blocks of a CU or a sub-CU. OBMC may include multiple motion compensation operations for one or more (for example, each) sub-block. For example, MVs of four connected neighboring sub-blocks, if they are available and not identical to the MV of current sub-block, may be used to derive a prediction block for the current sub-block.

Figure 11:
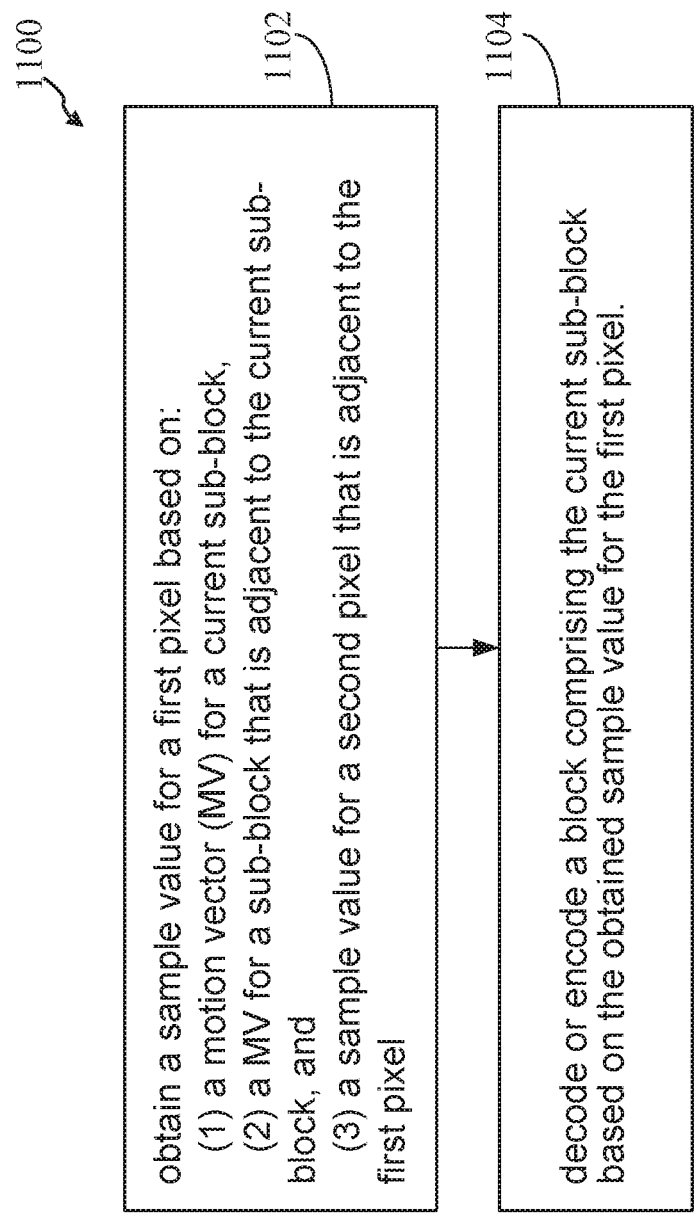
FIG. 11 illustrates an example of a method for sub-block/block refinement according to one or more of Equations (1)-(25).

A method for sub-block/block refinement, for example, pixel level refinement, may be provided. For example, the method may be used to reduce boundary discontinuity. FIG. 11 provides an example of the method. The method as described in FIG. 11 may be applied in the decoder and/or encoder.

FIG. 11 illustrates an example of a method for sub-block/block refinement according to one or more of Equations (1)-(25). Examples disclosed herein and other examples may operate in accordance with example method 1100 shown in FIG. 11. Method 1100 comprises 1102 and 1104. In 1102, a sample value for a first pixel may be obtained based on, for example: (1) a motion vector (MV) for a current sub-block, (2) a MV for a sub-block that is adjacent to the current sub-block, and (3) a sample value for a second pixel that is adjacent to the first pixel. In 1104, a block comprising the current sub-block may be encoded or decoded based on the obtained sample value for the first pixel. When the method as described in FIG. 11 is applied to the decoder, 1104 in FIG. 11 may be performed by the decoder, and 1104 may entail decoding a block comprising the current sub-block based on the obtained sample value for the first pixel. When the method as described in FIG. 11 is applied to the encoder, 1104 in FIG. 11 may be performed by the encoder, and 1104 may entail encoding a block comprising the current sub-block based on the obtained sample value for the first pixel.

Examples of methods for sub-block/block refinement are provided, for example, for encoding and decoding. Examples may refer to a "boundary," which includes different types of boundaries, such as boundaries of blocks, sub-blocks, CUs, and/or PUs. Examples may refer to "neighbor," which may include different types of neighbors, such as spatial neighbors and temporal neighbors of blocks, sub-blocks, CUs, and/or PUs. Examples may refer to "adjacent," which includes different types of adjacency, such as an adjacent block, an adjacent sub-block, an adjacent pixel, and/or a pixel adjacent to a boundary. Spatial neighbors may be adjacent in the same frame while temporal neighbors may be at the same location in adjacent frames. For example, an adjacent sub-block is a sub-block that may be a spatial or a temporal neighbor. A boundary pixel is a pixel adjacent to a boundary, where a boundary may be any type of boundary. For example, a boundary pixel may be adjacent to a boundary of a block, a sub-block, a CU, and/or a PU.

Sub-block/block refinement may include sub-block/block boundary refinement. For example, an MV difference between a current block and/or sub-blocks and neighboring blocks and/or sub-blocks may be calculated and converted to a difference of sample value derived by an optical flow equation. The pixel intensity (for example, luma and/or chroma) of a boundary pixel(s) of the current block and/or sub-blocks) may be refined, for example, by adding the derived difference value. The derived difference value may be referred to as block boundary prediction refinement with optical flow (BBPROF). A sample value offset for the boundary pixel may indicate the derived difference value. A sample value for the boundary pixel may indicate the pixel intensity of the boundary pixel. The BBPROF (for example, as described herein) may provide pixel level granularity for sub-block and block boundary refinement, BBPROF (for example, as described herein) may be applied to any sub-block based inter prediction mode and/or CU based inter prediction mode.

A boundary pixel may include a pixel at a boundary of a block and/or subblock. For example, a square-shape subblock may have four boundaries including the left, right, top, and bottom boundary. The boundary may include a common boundary that are shared between two sub-blocks. The two sub-blocks may abut each other at the boundary. A pixel may be located at the boundary when the pixel is located near the boundary. For example, the pixel may be located at the boundary when the pixel is in a number (for example, 4, 3, 2, or 1) rows of pixels from the top boundary of the sub-block, in the number of rows of pixels from the bottom boundary of the sub-block, in the number (for example, 4, 3, 2, or 1) of columns of pixels from the left boundary of the sub-block, or in the number columns of pixels from the right boundary of the sub-block. In certain examples, a first pixel may be or located at the common boundary of a first sub-block when the first pixel is located inside the first sub-block and abuts a pixel that is inside a second sub-block that shares the common boundary with the first sub-block. In certain examples, a pixel may be located at the boundary of the sub-block but outside the sub-block.

BBPROF may be applied, for example, in DMVR mode. BBPROF may reduce the block boundary discontinuity of DMVR based sub-block level motion compensated prediction. A change in pixel intensity may be applied by BBPROF, Pixel intensity change may be derived, for example, from an optical flow equation. A sample value offset for the pixel may indicate the pixel intensity change. BBPROF may be used to perform one (for example, only one) motion compensation operation per sub-block. Motion compensation in DMVR mode may perform one motion compensation operation per sub-block.

A refined motion vector for a sub-block in the CU may be derived, for example, by performing DMVR (for example, as described herein). Sub-block based motion compensation (for example, as described herein) may be performed to generate a sub-block based prediction.

Spatial gradients $g_x(i,j)$ and $g_y(i,j)$ of a sub-block prediction may be calculated at one or more (for example, each) pixel/sample location (for example, as described herein).

A motion vector difference $MV_{diff}$ between a current sub-block and one or more neighboring sub-blocks that are being considered (considered neighboring sub-blocks) may be calculated. This MV difference may be at a sub-block level. Each candidate neighboring sub-block that is not far away from (for example, proximate to or near) the current sub-block may be considered. Various quantities and/or locations of sub-blocks may be selected as neighboring sub-blocks to calculate $MV_{diff}$. In examples, BBPROF in DMVR mode may use four neighboring sub-blocks (for example, left, above, right and bottom neighboring sub-blocks), two neighboring sub-blocks (for example, top and left neighboring sub-blocks), corner neighboring sub-blocks (for example, top-left, bottom-right), or other quantities and positions of neighboring sub-blocks to calculate $MV_{diff}$.

In an example, four neighboring sub-blocks (for example, above, below, left and right sub-blocks that abut the current sub-block) may be considered, where $MV_{diff}$ may be an MV difference set that includes four different MV difference values. For example, $MV_{diff}$ may be calculated as $MV_{diff}=\{MV_{diff}(A), MV_{diff}(B), MV_{diff}(L), MV_{diff}(R)\}$, where A, B, L, R may represent the MV difference between the current sub-block and the above, below, left and right sub-blocks respectively.

Figure 12:
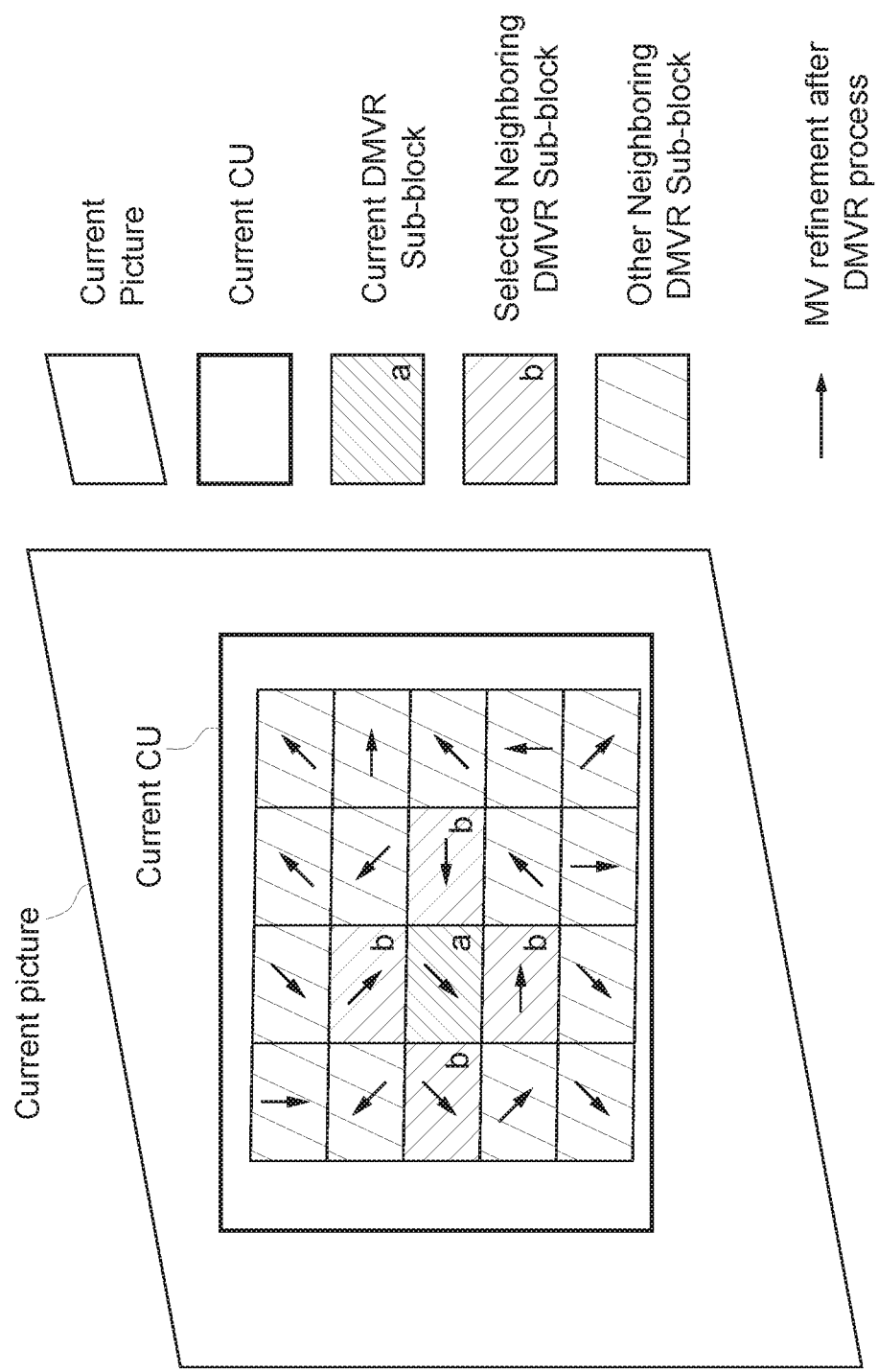
FIG. 12 illustrates an example MV difference calculation from selected neighboring sub-blocks.

FIG. 12 depicts an example MV difference calculation from selected neighboring sub-blocks, for example, in DMVR mode. As shown in FIG. 12, a sub-block may have its own MV difference after DMVR. A current sub-block (for example, the current DMVR sub-block in FIG. 12) within a CU may have four connected neighboring sub-blocks, for example, except for current sub-blocks located at boundaries.

The calculated sub-block level MV difference $MV_{diff}$ may be used to calculate a motion vector offset $\Delta v(i,j)$ at one or more (for example, each) pixel/sample location within a current sub-block, for example, as shown in Equation 21.

$$\Delta v(i, j) = \sum_{n=0}^{N} w(i, j, n) * MV_{diff}(n) \tag{21}$$

where n may be the index for a specific neighboring sub-block, N may be the total number of considered neighboring sub-blocks, and w(i,j,n) may be a weighting factor when a neighboring $MV_{diff}$ (n) is applied for a specific pixel at location (i, j). N may be equal to 4, for example, if left, above, right and bottom neighboring sub-blocks are considered.

A set of weighting factors may be, for example, {¼, ⅛, ⅟16, ⅟32}. The weighting factors may be used, respectively, by four rows/columns of pixels at one or more (for example, each) side of the current sub-block. MV difference $MV_{diff}$ may be calculated, for example, based on motion vectors of vertically and/or horizontally neighboring sub-blocks. Pixels in the same row and/or column of a current sub-block may use the same weighting factor. For example, pixels in the first column of the left side of the current sub-block may use the same weighting factor (for example, ¼), and pixels in the second column may use the same weighting factor (for example, ⅛), etc. A weighting factor may be determined, for example, based on the distance from a current position to the block boundary between the current block and its neighboring block. A weighting factor may be smaller, for example, when a column and/or row are farther away from the block boundary.

A weighting factor may be (for example, dynamically) adjusted, for example, based on a pixel location. In an example, pixels may be located at the top left of the current sub-block. An MV difference from left and above neighboring sub-blocks may be weighted together/combined to generate a final MV offset at the pixels, for example, if both left and above neighboring sub-blocks exist and if MV differences from left and above neighboring are both not zero. Left or above neighboring sub-blocks may be unavailable, for example, if the current sub-block is on the left or top boundary of the current Cu.

An intensity change per pixel within the current sub-block may be calculated, for example, according to optical flow equation 22:

$$\Delta I(i,j)=g_x(i,j)*\Delta v_x(i,j)+g_y(i,j)*\Delta v_y(i,j) \tag{22}$$

where the Δv(i,j) and g(i,j) may be the MV offset and spatial gradient at one or more (for example, every) sample location (i,j), which may be calculated, for example, in previous steps.

A prediction for a pixel or a sample location may be refined, for example, by adding the calculated intensity change (for example, luminance or chrominance) to the sub-block prediction. The refined prediction for the pixel or sample location may be associated with a certain reference picture list, for example, list L0 or list L1. The final prediction I' may be generated, for example, according to Equation 23:

$$I'(i,j)=I(i,j)+\Delta I(i,j) \quad (23)$$

Four neighboring sub-blocks (for example, at most) may be considered when BBPROF is applied in DMVR mode. Inner sub-blocks may wait for the DMVR process of neighboring sub-blocks to complete. In examples, two neighboring sub-blocks may be considered when BBPROF is applied in DMVR mode. In examples, two neighbors (for example, only top and left neighbors) may be considered, for example, so that a BBPROF of a current sub-block may depend on the DMVR process for two neighboring sub-blocks.

BBPROF may be applied in SbTMVP mode. For example, BBPROF may reduce the discontinuity at a sub-block boundary of an SbTMVP based sub-block level motion compensation prediction. One or more examples herein for applying BBPROF in DMVR mode may be applicable to performing BBPROF in SbTMVP mode. Applying BBPROF in SbTMVP mode may include performing one (for example, only one) motion compensation operation per sub-block. SbTMVP motion compensation may perform one motion compensation operation per sub-block. Applying BBPROF in SbTMVP mode may include one or more of the following.

A refined motion vector for one or more (e.g., each) of the sub-blocks in the CU may be derived, for example, by performing SbTMVP (for example, as described herein). Motion information may be fetched from collocated sub-CU(s). Appropriate temporal scaling may be applied to the motion information. Sub-block based motion compensation may be performed, for example, to generate a sub-block based prediction.

Spatial gradients $g_x(i,j)$ and $g_y(i,j)$ of the sub-block prediction may be calculated at one or more (for example, all) pixel/sample locations (for example, as described herein).

A motion vector difference $MV_{diff}$ may be calculated between the current sub-block and, for example, one or more considered neighboring sub-blocks.

Prediction refinement as described herein may be applied in ATMVP. In an example, the prediction refinement may use motion vectors of four neighboring sub-blocks of a current sub-block that are shown in FIG. 9. The motion vectors may be used to derive MV difference $MV_{diff}$ between a current sub-block and spatial neighboring sub-blocks.

The calculated sub-block level MV difference $MV_{diff}$ may be used to calculate a motion vector offset Δv(i,j) at one or more (for example, each) of the pixel/sample locations within the current sub-block.

An intensity change per pixel within the current sub-block may be calculated by an optical flow equation (for example, based on Equation 22).

A prediction for one or more (for example, each) of the reference picture lists may be refined, for example, by adding the intensity change (for example, luminance or chrominance). The final prediction may be generated, for example, according to Equation 24:

$$I'(i,j)=I(i,j)+\Delta I(i,j) \quad (24)$$

BBPROF may be applied in affine mode. BBPROF may be applied to affine coded CUs (for example, similar to SbTMVP). An affine coded CU may include multiple sub-blocks. The block level MV for one or more (for example, each) of the sub-blocks may be derived by an affine motion model (for example, as described herein). The four parameters of a 4-parameter affine model and/or the six parameters of a 6-parameter affine model may be estimated, for example, with two or three control point motion vectors. The four or six estimated affine model parameters may be used, for example, to derive the block level motion vectors of the sub-blocks within an affine coded CU. The sub-block level MV difference $MV_{diff}$ and/or motion vector offset Δv(i,j) at one or more (for example, each) of the pixel/sample locations within a sub-block may be calculated, for example, with the different sub-block motion vectors. For example, the sub-block level MV difference $MV_{diff}$ and/or motion vector offset Δv(i,j) may be calculated (for example, where BBPROF may be performed as described herein).

BBPROF may be applied to a pixel that is adjacent to a CU boundary, for example, as described herein for a pixel that is adjacent to a boundary of a sub-block. For example, BBPROF may be applied at the CU level. The reference picture may be the same or different, for example, for adjacent CUs.

A CU level MV difference $MV_{diff}$ may be calculated (for example, directly calculated) for a specific CU, for example, if the selected neighboring CUs (for example, above, below, left and right CUs) have the same reference pictures as the current CU. The prediction of boundary pixels of the specific CU may be refined, for example, by applying BBPROF (for example, directly).

Temporal motion scaling may be applied for a specific CU, for example, if (i) one or more (for example, all) of the selected neighboring CUs (for example, above, below, left and right CUs) and (ii) the current CU have different reference pictures in a reference picture list. Proper temporal motion scaling may align the reference pictures of the temporal motion vectors of the selected neighboring CUs to the reference picture of the specific CU. The CU level MV difference $MV_{diff}$ may be calculated (for example, based on the scaled MVs of the selected neighboring CUs) and prediction refinement at CU boundary may be achieved, for example, by applying BBPROF.

Multiple implementation variations of BBPROF are provided as additional examples. The quantity and positions of neighboring (for example, adjacent) sub-blocks that may be selected for sub-block/block refinement, such as sub-block/block boundary refinement (for example, BBPROF) may not be limited to examples described herein, such as the example described with reference to FIG. 12. Other quantities and/or locations of sub-blocks may be selected. Each candidate neighboring sub-block that is not far away from (for example, proximate to or near) the current sub-block may be considered. For example, BBPROF may use corner neighboring sub-blocks (for example, top-left, bottom-right), the four sub-blocks shown in FIG. 12 or other quantities and positions of neighboring sub-blocks to calculate $MV_{diff}$.

The positions of considered neighboring sub-blocks may not be limited to be within the same CU as the current sub-block. An aspect ratio of the considered neighboring sub-blocks from adjacent CUs may or may not be limited to be the same as the current sub-block. Different aspect ratios may be allowed for sub-block/block refinement, such as sub-block/block boundary refinement (for example, BBPROF).

An MV offset at a pixel/sample location may be derived, for example, based on a sub-block MV difference. The number of rows and/or columns of pixels at one or more (for example, each) of the sides of the current sub-block may be configurable and/or dynamically changed, for example, based on one or more (for example, predefined) criteria. For example, two or more columns of pixels at the left side of a current sub-block may include an MV difference from the left neighboring sub-block, for example, instead of a default number of columns of pixels, such as, for example, four columns of pixels.

An MV difference may be based on vertically and/or horizontally neighboring sub-blocks. In examples, pixels in the same row and/or column of a current sub-block may use the same weighting factor. In examples, pixels in the same row and/or column of a current sub-block may use different weighting factors.

A weighting factor may vary. For example, a weighting factor may increase as a spatial distance between the pixel and a vertical or horizontal boundary decreases.

An intensity difference (for example, as derived from Equation 22) may be multiplied by a weight factor w, for example, before the intensity difference is added to a prediction, as shown, for example, in Equation 25:

$$I'(i,j)=I(i,j)+w \cdot \Delta I(i,j) \quad (25)$$

where w may be set to a value between 0 to 1, inclusive. The w may be signaled, for example, at a CU level or a picture level. For example, w may be signaled by a weight index. Equation 25 may be a variation of Equation 23 and/or Equation 24.

BBPROF may be used, for example, after DMVR based L0 prediction and L1 prediction are combined with weights. BBPROF may be applied, for example, to one prediction, such as L0 or L1, for example, to reduce complexity. In examples, BBPROF may be applied to one prediction where, for example, the reference picture is closer to the current picture in the time domain. In examples, BBPROF may be applied to one prediction where, for example, the reference picture is further away from the current picture in the time domain.

Many embodiments are described herein. Features of embodiments may be provided alone or in any combination, across various claim categories and types. Further, embodiments may include one or more of the features, devices, or aspects described herein, alone or in any combination, across various claim categories and types, such as, for example, any of the following.

The method as described in FIG. 11 may be applied to the decoder and/or encoder. When the method as described in FIG. 11 is applied to the encoder, 1104 in FIG. 11 may be performed by the encoder, and 1104 may entail encoding a block comprising the current sub-block based on the obtained sample value for the first pixel. The method as described in FIG. 11 may be based on one or more of Equations (1)-(25). For example, a decoder may decode a current sub-block based on a sample value for a pixel. The pixel may be located at one of the boundaries of the current sub-block. The sample value may be a refined sample value that is obtained based on one or more of Equations (1)-(25), As shown one or more of Equations (1)-(25), the decoder may obtain the sample value for the pixel based on, for example, an MV for the current sub-block, an MV for a sub-block adjacent to the current sub-block, and a sample value for a pixel that is adjacent to the pixel for which the sample value is obtained. The decoder may obtain a prediction of the sample value for the pixel, for example, before the decoder refines the prediction of the sample value. The prediction of the sample value for the pixel may be referred to as I(i,j), for example, as shown in Equation (23). As shown in Equation (23), the decoder may obtain the sample value for the pixel based on a sample value offset and the prediction of the sample value, for example, a summation of the sample value offset and the prediction of the sample value. The sample value offset for the pixel may be referred to as $\Delta I(i,j)$, for example, as shown in Equation (23). As shown in one or more Equations (1)-(25), the sample value offset may be obtained based on, for example, the MV for the current sub-block, the MV for the sub-block adjacent to the current sub-block, and the sample value for the pixel adjacent to the pixel for which the sample value is obtained. The decoder may obtain an MV difference (for example, the MV difference in Equation (21)) using the MV for the current sub-block and the MV for the sub-block adjacent to the current sub-block as described herein. The MV difference may be referenced as $MV_{diff}(n)$, for example, as shown in Eq. 21, The decoder may obtain an MV difference using one or more MVs associated with one or more respective sub-blocks that are adjacent to the current sub-block. The decoder may obtain a gradient using the sample value for the pixel adjacent to the pixel for which the sample value is obtained, for example, as shown in Equations (15) and (16). As the examples show in Equations (15) and (16), the decoder may obtain a gradient using one or more sample values for one or more respective pixels that are adjacent to the pixel for which the sample value is obtained. The decoder may obtain the sample value for the pixel based on the gradient and the MV difference. In an example, the decoder may obtain a MV offset based on the MV difference as shown in Equation (21). The decoder may use the MV offset and the gradient to obtain the sample value for the pixel as shown in Equations (22) and (23). The decoder may obtain a sample value offset based on the gradient and the MV difference, and obtain the sample value for the pixel using the sample value offset. The decoder may determine a weighting factor and use the weighting factor to obtain the sample value for the pixel, for example, as shown in Equation (21). The decoder may decode a block comprising the current sub-block based on the obtained sample value for the pixel.

Decoding tools and techniques including one or more of entropy decoding, inverse quantization, inverse transformation, and differential decoding may be used to enable the method as described in FIG. 11 in the decoder. These decoding tools and techniques may be used to enable one or more of sub-block/block refinement according to the method as described in FIG. 11; sub-block/block boundary refinement according to the method as described in FIG. 11; BBPROF according to the method as described in FIG. 11; sub-block/block refinement in DMVR mode; sub-block/block refinement in SbTMVP mode; sub-block/block refinement in affine mode; obtaining the sample value according to the method as described in FIG. 11; obtaining the sample value offset according to the method as described in FIG. 11; obtaining a gradient as described herein; obtaining a MV difference as described herein; obtaining a prediction for the sample value; and other decoder behaviors that are related to any of the above.

An encoder may encode a current sub-block based on a sample value for a pixel. The pixel may be located at one of the boundaries of the current sub-block. The sample value may be a refined sample value that is obtained based on one or more of Equations (1)-(25), As shown one or more of Equations (1)-(25), the encoder may obtain the sample value for the pixel based on, for example, an MV for the current sub-block, an MV for a sub-block adjacent to the current sub-block, and a sample value for a pixel that is adjacent to the pixel for which the sample value is obtained. The encoder may obtain a prediction of the sample value for the pixel, for example, before the encoder refines the prediction of the sample value. The prediction of the sample value for the pixel may be referred to as/(i,j), for example, as shown in Equation (23). As shown in Equation (23), the encoder may obtain the sample value for the pixel based on a sample value offset and the prediction of the sample value, for example, a summation of the sample value offset and the prediction of the sample value. The sample value offset for the pixel may be referred to as $\Delta I(i,j)$, for example, as shown in Equation (23). As shown in one or more Equations (1)-(25), the sample value offset may be obtained based on, for example, the MV for the current sub-block, the MV for the sub-block adjacent to the current sub-block, and the sample value for the pixel adjacent to the pixel for which the sample value is obtained. The encoder may obtain an MV difference (for example, the MV difference in Equation (21)) using the MV for the current sub-block and the MV for the sub-block adjacent to the current sub-block as described herein. The MV difference may be referenced as $MV_{diff}(n)$, for example, as shown in Equation (21). The encoder may obtain an MV difference using one or more MVs associated with one or more respective sub-blocks that are adjacent to the current sub-block. As shown in Equations (15) and (16), the encoder may obtain a gradient using the sample value for the pixel adjacent to the pixel for which the sample value is obtained. As the examples show in Equations (15) and (16), the encoder may obtain a gradient using one or more sample values for one or more respective pixels that are adjacent to the pixel for which the sample value is obtained. The encoder may obtain the sample value for the pixel based on the gradient and the MV difference. In an example, the encoder may obtain a MV offset based on the MV difference, as shown in Equation (21). The encoder may use the MV offset and the gradient to obtain the sample value for the pixel as shown in Equations (22) and (23). The encoder may obtain a sample value offset based on the gradient and the MV difference, and obtain the sample value for the pixel using the sample value offset. The encoder may determine a weighting factor and use the weighting factor to obtain the sample value for the pixel, for example, as shown in Equation (21). The encoder may encode a block comprising the current sub-block based on the obtained sample value for the pixel.

Encoding tools and techniques including one or more of quantization, entropy coding, inverse quantization, inverse transformation, and differential coding may be used to enable the method as described in FIG. 11 in the encoder. These encoding tools and techniques may be used to enable one or more of sub-block/block refinement according to the method as described in FIG. 11; sub-block/block boundary refinement according to the method as described in FIG. 11; BBPROF according to the method as described in FIG. 11; sub-block/block refinement in DMVR mode; sub-block/block refinement in SbTMVP mode; sub-block/block refinement in affine mode; obtaining the sample value according to the method as described in FIG. 11; obtaining the sample value offset according to the method as described in FIG. 11; obtaining a gradient as described herein; obtaining an MV difference as described herein; obtaining a prediction for the sample value; and other encoder behaviors that are related to any of the above.

A syntax element(s) may be inserted in the signaling, for example, to enable the decoder to identify an indication associated with performing the method as described in FIG. 11, or the method to use. For example, the syntax element may include an indication of one or more of BBPROF, DMVR, SbTMVP mode, affine mode, for example, to indicate to the decoder whether one or more of them are enabled or disabled. As an example, the syntax element may include an indication of one or more weighting factors as described herein, and/or an indication of a parameter that the decoder uses to perform one or more examples herein.

The method as described in FIG. 11 may be selected and/or applied, for example, based on the syntax element(s) to apply at the decoder. For example, the decoder may receive an indication that indicates enabling BBPROF. Based on the indication, the decoder may perform a method as described in FIG. 11 on a pixel that is located at or near a boundary of a sub-block.

The encoder may adapt prediction residual based on one or more examples herein. A residual may be obtained, for example, by subtracting a predicted video block from the original image block. For example, the encoder may predict a video block based on the sample value for the pixel that is obtained as described herein. The encoder may obtain the original image block and subtract the predicted video block from the original image block to generate a prediction residual.

A bitstream or signal may include one or more of the described syntax elements, or variations thereof. For example, a bitstream or signal may include a syntax element(s) that indicates any of BBPROF, DMVR, SbTMVP mode, affine mode is enabled or disabled.

A bitstream or signal may include syntax conveying information generated according to one or more examples herein. For example, information or data may be generated in performing the example as shown in FIG. 11. The generated information or data may be conveyed in syntax included in the bitstream or signal.

Syntax elements that enable the decoder to adapt a residue(s) in a manner corresponding to that used by an encoder may be inserted in a signal. For example, the residual may be generated using one or more examples herein.

A method, process, apparatus, medium storing instructions, medium storing data, or signal for creating and/or transmitting and/or receiving and/or decoding a bitstream or signal that includes one or more of the described syntax elements, or variations thereof.

A method, process, apparatus, medium storing instructions, medium storing data, or signal for creating and/or transmitting and/or receiving and/or decoding according to any of the examples described.

A method, process, apparatus, medium storing instructions, medium storing data, or signal according to, but not limited to one or more of the following: determining a spatial gradient of the sub-block based prediction at one or more pixels/sample locations; using an MV difference to calculate a motion vector offset at one or more pixels/sample locations; determining an intensity change per pixel in a current sub-block, for example, based on an optical flow; refining a prediction for a reference picture list, for example, by adding a calculated intensity change to a sub-block prediction; determining that a first pixel is adjacent to a boundary of the current sub-block; determining a difference between the MV for the current sub-block and the MV for the sub-block that is adjacent to the current sub-block; determining a gradient for the first pixel based on the sample value for a second pixel that is adjacent to the first pixel and a sample value for a third pixel that is adjacent to the first pixel; determining a sample value offset based on the determined gradient and the difference between the MV for the current sub-block and the MV for the sub-block that is adjacent to the current sub-block; obtaining the sample value for the first pixel based on the determined sample value offset; determining a gradient, for example, based on at least the sample value for the second pixel; determining a sample value for the first pixel using the gradient; determining a gradient for an optical flow model, for example, based on at least the sample value for the second pixel; using the gradient in an optical flow model to obtain the sample value for the first pixel; using a difference between the MV for the current sub-block and the MV for the sub-block that is adjacent to the current sub-block to obtain the sample value for the first pixel; obtaining the sample value for the first pixel, for example, further, based on an MV for the second sub-block that is adjacent to the current sub-block; obtaining the sample value for the first pixel based on a determination that the first pixel is adjacent to a boundary of the current sub-block; using a weighting factor to obtain the sample value for the first pixel, where the weighting factor may or may not vary in accordance with a distance of the first pixel from a corresponding boundary of the current sub-block; determining a sample value offset for the first pixel, for example, based on the MV for the current sub-block, the MV for the sub-block that is adjacent to the current sub-block, and the sample value for the second pixel that is adjacent to the first pixel; obtaining the sample value for the first pixel using the determined sample value offset and a predicted sample value for the first pixel; and obtaining the sample value for the first pixel based on a determination that the first pixel is adjacent to a boundary of the current sub-block, for example, where the boundary of the current sub-block may comprise a common boundary between the current sub-block and the sub-block that is adjacent to the current sub-block.

A TV, set-top box, cell phone, tablet, or other electronic device that performs block/sub-block/CU refinement according to any of the examples described.

A TV, set-top box, cell phone, tablet, or other electronic device that performs block/sub-block/CU refinement according to any of the examples described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs block/sub-block/CU refinement according to any of the examples described.

A TV, set-top box, cell phone, tablet, or other electronic device that receives (e.g. using an antenna) a signal over the air that includes an encoded image, and performs block/sub-block/CU refinement according to any of the examples described.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor, Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for video decoding, comprising one or more processors, wherein the one or more processors are configured to:
    obtain a sample value for a first pixel based on a motion vector (MV) for a current sub-block, a MV for a sub-block that is adjacent to the current sub-block, and a sample value for a second pixel that is adjacent to the first pixel, wherein the first pixel is a boundary pixel of the current sub-block; and
    decode a block comprising the current sub-block based on the obtained sample value for the first pixel.

2. The apparatus of claim 1, wherein the block comprises the first pixel, the second pixel, and a third pixel that is adjacent to the first pixel, wherein the one or more processors are configured to:
    determine that the first pixel is the boundary pixel of the current sub-block; and
    based on a determination that the first pixel is the boundary pixel of the current sub-block,
        determine a difference between the MV for the current sub-block and the MV for the sub-block that is adjacent to the current sub-block,
        determine a gradient for the first pixel based on the sample value for the second pixel and a sample value for the third pixel, and
        determine a sample value offset based on the determined gradient and the difference between the MV for the current sub-block and the MV for the sub-block that is adjacent to the current sub-block, wherein the sample value for the first pixel is obtained based on the determined sample value offset.

3. The apparatus of claim 1, wherein the one or more processors are further configured to determine a gradient based on at least the sample value for the second pixel, wherein the sample value for the first pixel is obtained using the gradient.

4. The apparatus of claim 1, wherein obtaining the sample value for the first pixel based on the MV for the current sub-block, the MV for the sub-block that is adjacent to the current sub-block, and the sample value for the second pixel that is adjacent to the first pixel comprises obtaining the sample value for the first pixel based on the sample value for the second pixel that is adjacent to the first pixel and based on a MV difference between the MV for the current sub-block and the MV for the sub-block that is adjacent to the current sub-block.

5. The apparatus of claim 1, wherein the sub-block that is adjacent to the current sub-block is a first sub-block, and the block comprises the first sub-block and a second sub-block that is adjacent to the current sub-block, wherein the sample value for the first pixel is obtained further based on a MV for the second sub-block.

6. The apparatus of claim 1, wherein the first pixel and the second pixel are in the current sub-block.

7. The apparatus of claim 1, wherein a weighting factor that varies in accordance with a distance of the first pixel from a corresponding boundary of the current sub-block is used to obtain the sample value for the first pixel.

8. The apparatus of claim 1, further comprising:
at least one of (i) an antenna configured to receive a signal, the signal including data representative of an image, (ii) a band limiter configured to limit the received signal to a band of frequencies that includes the data representative of the image, or (iii) a display configured to display the image.

9. The apparatus of claim 1, wherein the one or more processors are further configured to obtain a MV difference between the MV for the current sub-block and the MV for the sub-block that is adjacent to the current sub-block, wherein the sample value for the first pixel is obtained based on the MV difference.

10. An apparatus for video encoding, comprising one or more processors, wherein the one or more processors are configured to:
obtain a sample value for a first pixel based on a motion vector (MV) for a current sub-block, a MV for a sub-block that is adjacent to the current sub-block, and a sample value for a second pixel that is adjacent to the first pixel, wherein the first pixel is a boundary pixel of the current sub-block; and
encode a block comprising the current sub-block based on the obtained sample value for the first pixel.

11. The apparatus of claim 10, wherein the block comprises the first pixel, the second pixel, and a third pixel that is adjacent to the first pixel, wherein the one or more processors are configured to:
determine that the first pixel is the boundary pixel of the current sub-block; and
based on a determination that the first pixel is the boundary pixel of the current sub-block,
determine a difference between the MV for the current sub-block and the MV for the sub-block that is adjacent to the current sub-block,
determine a gradient for the first pixel based on the sample value for the second pixel and a sample value for the third pixel, and
determine a sample value offset based on the determined gradient and the difference between the MV for the current sub-block and the MV for the sub-block that is adjacent to the current sub-block, wherein the sample value for the first pixel is obtained based on the determined sample value offset.

12. The apparatus of claim 10, wherein obtaining the sample value for the first pixel based on the MV for the current sub-block, the MV for the sub-block that is adjacent to the current sub-block, and the sample value for the second pixel that is adjacent to the first pixel comprises obtaining the sample value for the first pixel based on the sample value for the second pixel that is adjacent to the first pixel and based on a MV difference between the MV for the current sub-block and the MV for the sub-block that is adjacent to the current sub-block.

13. The apparatus of claim 10, wherein the one or more processors are further configured to determine a gradient for an optical flow model based on at least the sample value for the second pixel, and wherein the sample value for the first pixel is obtained using the optical flow model.

14. A method for video decoding, comprising:
obtaining a sample value for a first pixel based on a motion vector (MV) for a current sub-block, a MV for a sub-block that is adjacent to the current sub-block, and a sample value for a second pixel that is adjacent to the first pixel, wherein the first pixel is a boundary pixel of the current sub-block; and
decoding a block comprising the current sub-block based on the obtained sample value for the first pixel.

15. The method of claim 14, wherein the block comprises the first pixel, the second pixel, and a third pixel that is adjacent to the first pixel, wherein obtaining the sample value for the first pixel comprises:
determining that the first pixel is the boundary pixel of the current sub-block;
based on a determination that the first pixel is the boundary pixel of the current sub-block,
determining a difference between the MV for the current sub-block and the MV for the sub-block that is adjacent to the current sub-block,
determining a gradient for the first pixel based on the sample value for the second pixel and a sample value for the third pixel, and
determining a sample value offset based on the determined gradient and the difference between the MV for the current sub-block and the MV for the sub-block that is adjacent to the current sub-block; and
obtaining the sample value for the first pixel based on the determined sample value offset.

16. The method of claim 14, wherein obtaining the sample value for the first pixel based on the MV for the current sub-block, the MV for the sub-block that is adjacent to the current sub-block, and the sample value for the second pixel that is adjacent to the first pixel comprises obtaining the sample value for the first pixel based on the sample value for the second pixel that is adjacent to the first pixel and based on a MV difference between the MV for the current sub-block and the MV for the sub-block that is adjacent to the current sub-block.

17. The method of claim 14, wherein a gradient for an optical flow model is determined based on at least the sample value for the second pixel and is used in the optical flow model to obtain the sample value for the first pixel.

18. A computer readable medium including instructions for causing one or more processors to perform the method of claim 14.

19. A method for video encoding, comprising:
obtaining a sample value for a first pixel based on a motion vector (MV) for a current sub-block, a MV for a sub-block that is adjacent to the current sub-block, and a sample value for a second pixel that is adjacent to the first pixel, wherein the first pixel is a boundary pixel of the current sub-block; and
encoding a block comprising the current sub-block based on the obtained sample value for the first pixel.

20. The method of claim 19, wherein the block comprises the first pixel, the second pixel, and a third pixel that is adjacent to the first pixel, and the method comprises:
determining that the first pixel is the boundary pixel of the current sub-block; and
based on a determination that the first pixel is the boundary pixel of the current sub-block,
determining a difference between the MV for the current sub-block and the MV for the sub-block that is adjacent to the current sub-block,
determining a gradient for the first pixel based on the sample value for the second pixel and a sample value for the third pixel, and determining a sample value offset based on the determined gradient and the difference between the MV for the current sub-block and the MV for the sub-block that is adjacent to the current sub-block, wherein the sample value for the first pixel is obtained based on the determined sample value offset.

\* \* \* \* \*